United States Patent
Hikichi

(10) Patent No.: US 8,266,705 B2
(45) Date of Patent: Sep. 11, 2012

(54) INFORMATION TRANSMISSION APPARATUS, DATA TRANSMISSION APPARATUS, INFORMATION TRANSMISSION DESTINATION DESIGNATING METHOD, DATA TRANSMITTING DESIGNATING METHOD, DATA TRANSMITTING METHOD, PROGRAM AND STORAGE MEDIUM

(75) Inventor: Yukiyoshi Hikichi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1308 days.

(21) Appl. No.: 10/975,419

(22) Filed: Oct. 29, 2004

(65) Prior Publication Data

US 2005/0097171 A1    May 5, 2005

(30) Foreign Application Priority Data

Nov. 5, 2003   (JP) ................................. 2003-375080
Oct. 8, 2004   (JP) ................................. 2004-295535

(51) Int. Cl.
G06F 7/04        (2006.01)

(52) U.S. Cl. .............................. 726/26; 713/168; 705/74

(58) Field of Classification Search ..................... 726/26
See application file for complete search history.

(56) References Cited

U.S. PATENT DOCUMENTS

| | | | | |
|---|---|---|---|---|
| 7,589,857 | B2 * | 9/2009 | Oe | 358/1.16 |
| 2002/0013739 | A1 * | 1/2002 | O'Donnell et al. | 705/26 |
| 2002/0120874 | A1 * | 8/2002 | Shu et al. | 713/201 |
| 2005/0193064 | A1 * | 9/2005 | Hales | 709/206 |
| 2006/0190530 | A1 * | 8/2006 | Gruneberg et al. | 709/203 |

FOREIGN PATENT DOCUMENTS

| | | |
|---|---|---|
| JP | 11-024881 | 1/1999 |
| JP | 2002-169918 A | 6/2002 |

* cited by examiner

*Primary Examiner* — Samson Lemma
(74) *Attorney, Agent, or Firm* — Fitzpatrick, Cella, Harper & Scinto

(57) ABSTRACT

In order to enable utilization of a personal address book by another person while maintaining security, in case display of information on an information destination registered in the address book is requested from an unauthenticated user, a display is executed in a state where address information (fax number, e-mail address etc.) is concealed (for example by a mosaic pattern), and information on the information destination, displayed with the address information in such concealed state, can be designated as the information designation.

9 Claims, 18 Drawing Sheets

FIG. 13A

| | DESTINATION TABLE | | THE NUMBER OF DESTINATIONS: 0 |
|---|---|---|---|
| ACCESS NUMBER | ■ DESTINATION TABLE ● ALL ▼ | ■ KIND OF DESTINATION ● ALL ▼ | |

| ✓ | KIND | NAME | DESTINATION | |
|---|---|---|---|---|
| ☐ | 📠 | ABC INC. | 0312345678 | |

1/1

| あ | か | さ | た | な | は | ま | や.. | A-Z | 0-9 | DETAILED INFORMATION ▶ |

| CANCEL | | OK ↵ |

SYSTEM CONDITION/STOP ▶

FIG. 13B

| | DESTINATION TABLE | | THE NUMBER OF DESTINATIONS: 0 |
|---|---|---|---|
| ACCESS NUMBER | ■ DESTINATION TABLE ● ALL ▼ | ■ KIND OF DESTINATION ● ALL ▼ | |

| ✓ | KIND | NAME | DESTINATION | |
|---|---|---|---|---|
| ☐ | ⌨ | KANNON COMMERCE INC. | sales@kannon-syoji.co.jp | |
| ☐ | 📠 | KANNON DELIVERY INC. | 01201331333 | |
| ☐ | 📠 | ABC INC. | 0312345678 | |

1/1

| あ | か | さ | た | な | は | ま | や.. | A-Z | 0-9 | DETAILED INFORMATION ▶ |

| CANCEL | | OK ↵ |

SYSTEM CONDITION/STOP ▶

FIG. 18

2003 05/21 WED 16:40 iR3300i-103

* ****************************
* COMMUNICATION ADMINISTRATION REPORT *
* ****************************

| START TIME | DESTINATION ADDRESS | DESTINATION ABBREVIATED NAME | RECEIPT NUMBER | COMMUNICATION MODE |
|---|---|---|---|---|
| 1401 | 1402 | 1403 | 1404 | 1405 |
| *05/01 09:56 | ▓▓▓▓▓▓ | KANNON COMMERCE INC. | 1302 | RECEPTION |
| *05/01 09:58 | 03-1234-5678 | KANNON COMMERCE INC. | 1303 | TRANSMISSION |
| *05/01 09:58 | 03-1234-5678 | KANNON DELIVERY INC. | 5146 | RECEPTION |
| *05/01 14:32 | | ABC INC. | 1304 | TRANSMISSION |
| *05/01 14:47 | | ABC INC. | 1305 | TRANSMISSION |
| *05/02 08:54 | ▓▓▓▓▓▓ | KANNON DELIVERY INC. | 1306 | TRANSMISSION |
| *05/02 08:59 | | KANNON COMMERCE INC. | 1307 | TRANSMISSION |
| *05/02 10:04 | | | 1308 | TRANSMISSION |
| *05/02 19:35 | 03-1234-5678 | ABC INC. | 1309 | TRANSMISSION |
| *05/06 09:37 | ▓▓▓▓▓▓ | KANNON DELIVERY INC. | 1310 | TRANSMISSION |
| *05/06 14:45 | ▓▓▓▓▓▓ | KANNON DELIVERY INC. | 1311 | TRANSMISSION |
| *05/06 14:49 | ▓▓▓▓▓▓ | KANNON DELIVERY INC. | 1312 | TRANSMISSION |
| *05/06 17:32 | ▓▓▓▓▓▓ | | 5147 | RECEPTION |

FIG. 21

STORAGE MEDIUM SUCH AS FD, CD-R, ETC.

| DIRECTORY INFORMATION |
| --- |
| 1ST DATA PROC PROGRAM<br>PROGRAM CODE GROUP CORRESPONDING TO STEPS IN FLOW CHART OF FIG. 14 |
| 2ND DATA PROC PROGRAM<br>PROGRAM CODE GROUP CORRESPONDING TO STEPS IN FLOW CHART OF FIG. 19 |
| 3RD DATA PROC PROGRAM<br>PROGRAM CODE GROUP CORRESPONDING TO STEPS IN FLOW CHART OF FIG. 20 (INCLUDING FIG. 12) |

MEMORY MAP OF STORAGE MEDIUM

FIG. 22

- DESTINATION TABLE — THE NUMBER OF DESTINATIONS: 0
- ACCESS NUMBER
- DESTINATION TABLE: 1ST DEVELOPMENT SECTION
- KIND OF DESTINATION: ALL
- KIND | NAME

Dropdown (2201):
- ALL
- 1ST DEVELOPMENT SECTION
- 2ND DEVELOPMENT SECTION
- DESTINATION TABLE 3
- DESTINATION TABLE 4
- DESTINATION TABLE 5
- DESTINATION TABLE 6
- DESTINATION TABLE 7
- DESTINATION TABLE 8
- DESTINATION TABLE 9
- DESTINATION TABLE 10
- ONE-TOUCH BUTTON

あ か さ た な   A-Z   0-9   DETAILED INFORMATION ▶

CANCEL   OK

SYSTEM CONDITION/STOP

FIG. 23

- DESTINATION TABLE — THE NUMBER OF DESTINATIONS: 0
- ACCESS NUMBER
- DESTINATION TABLE: 1ST DEVELOPMENT SECTION
- KIND OF DESTINATION: ALL

INPUT OF ACCESS NUMBER

INPUT ACCESS NUMBER BY NUMERIC KEYS

[     ]

CANCEL   OK

CANCEL   OK

SYSTEM CONDITION/STOP

INFORMATION TRANSMISSION APPARATUS, DATA TRANSMISSION APPARATUS, INFORMATION TRANSMISSION DESTINATION DESIGNATING METHOD, DATA TRANSMITTING DESIGNATING METHOD, DATA TRANSMITTING METHOD, PROGRAM AND STORAGE MEDIUM

BACKGROUND OF THE INVENTION

1. Field of the Invention

The present invention relates to an information transmission apparatus for transmitting information by an e-mail, a facsimile or the like, more particularly to an address book storing a transmission destination in the information transmission apparatus.

2. Related Background Art

Office equipment such as a copying apparatus is recently shifting to an electronic configuration, and there is increasing a product capable not only of copying an original image on paper but also transmitting data, read from an original, to a host computer through an e-mail. Such office equipment, having plural functions further including a facsimile function, is called a multifunction peripheral (MFP).

On the other hand, such MFP is usually utilized in an office by plural users. Also an address book, storing transmission destinations of e-mails, is used in common by plural users.

With an increase in the number of users, the destination addresses need to be classified by users or by divisions.

FIG. 22 is a schematic view of an operating image for an address book in such information transmission apparatus, in which transmission addresses can be classified by divisions.

In an example shown in FIG. 22, an address book for "First Development Section" and an address book for "Second Development Section" can be switched by a divisional address switching pull-down list 2201 at the center of the image.

Also, it may be required not only to classify the address book but also not to show the address information of own division to unrelated persons. For example, an operator may erroneously use customer address information of another division thereby resulting in a divulging of information.

For such difficulty, a method utilizing an access code is effective. It is possible to only display, on an address book, addresses that matches an access code entered by the operator and authenticated.

FIG. 23 is a schematic view showing an operation image for entering an access code in case of utilizing an address book in an information transmission apparatus of this kind.

By entering an access code in the operation image shown in FIG. 23, the address book only displays addresses which matches the access code and which can thus be utilized as transmission destinations for the information.

Such function allows to prevent the information from being observed by an unauthorized person and to prevent erroneous operation. Such technology is described in patent reference 1 (Japanese Patent Application Laid-open No. 11-024881).

However, in a deeper consideration, from the standpoint of the user, of such apparatus in an environment installed in an actual office and is utilized by various users, there may possibly occur a situation where it becomes desirable to cause the address book, which is inhibited from being viewed or utilized by unauthorized personnel, to be used by those other than the authorized personnel.

As an example, let us consider a situation where a user currently out of the office wishes to transmit, to a customer by e-mail, a document owned by the user in his office. In such situation, it is probable that the user, being currently out of the office, will ask his colleague in the office to transmit such document to the customer. In such situation, it is necessary to allow the colleague to use the address book of the user through the operation unit of the aforementioned apparatus.

Therefore, the user out of the office tells his access code for example by telephone to the colleague in the office, who then opens the address book of the user in the apparatus and uses the e-mail address in the address book as the address for transmission.

Thus the user can achieve his wish by asking the transmission of his document to the colleague present in his office, but, since the access code is entered by such colleague, the e-mail addresses of the customers of the user may be looked at by the colleague. In this manner, there can be foreseen a drawback that user's private information may be seen by another person in case of asking a job to such another person.

Such drawback, leading to a divulging of an access code or address information in case of a mere designation of a destination, is undesirable from the standpoint of security (first drawback).

On the other hand, the destination information will become visible from a transmission history report which is printed out at a predetermined time. A similar situation occurs in a transmission history image that can be viewed on an operation panel.

More specifically, the MFP has a communication management reporting function of printing out a list of transmitted/received data for the purpose of apparatus management, and, in such report, a time of communication and a name of the communication destination are printed out in a list.

Such communication management report is undesirable from the standpoint of security, as it also displays address information of the destination, such as a telephone number and an e-mail address of the destination, in addition to the aforementioned name of the destination.

However, if the printing or viewing of the history is all prohibited, it will not be possible to confirm the presence of the communication itself. Thus there is anticipated a drawback (second drawback) that the operation status of the apparatus will become difficult to manage.

Still another drawback arises from a fact that a broadcast transmission is possible at the transmission of information.

For example, in case a user with a malicious intent adds, in a broadcast transmission of an original image, another address to the destination, such information will become known to the third persons. Also in case of an e-mail, the addresses of all the destinations will become visible by removing the header information of the mail (third drawback).

SUMMARY OF THE INVENTION

An object of the present invention is to provide an information transmission apparatus, an information transmission destination designating method, a program and a storage medium, all capable of solving the above drawbacks.

The present invention is to enable even an unauthenticated user to transmit information utilizing registration means such as an address book, but without knowing address information such as an e-mail address or a facsimile number.

Also the present invention is to make a transmission history available, while maintaining address information not available to a third person.

Also the present invention is to avoid utilization of address information, by a third party recipient of transmitted information.

Also the present invention is to provide an information transmission apparatus, an information transmission destination designating method, a program and a storage medium that are capable of preventing various possible drawbacks, for example a drawback that a fulfillment of one of plural desires of the user inhibits fulfillment of other desires, a drawback that a priority given to one of plural desires of the user leads to another new difficulty, or a drawback that a prevention of all the difficulties results in an inhibition of the desired process itself, thereby allowing to precisely respond to various needs and desires of the user and matching the actual standpoint of the user in consideration of the actual office environment or the actual environment of use of the apparatus by various users, for example allowing a private address book to be utilized by another person while maintaining privacy.

Still other objects of the present invention, and features thereof, will become fully apparent from the following description to be taken in conjunction with the accompanying drawings.

BRIEF DESCRIPTION OF THE DRAWINGS

FIGS. 13A and 13B are schematic views showing examples of an operation image in the information transmission apparatus of the present invention;

FIG. 18 is a schematic view showing an example of a communication management report issued by an MFP in a second embodiment of the present invention;

FIG. 21 is a view showing a memory map of a storage medium storing various data processing programs readable by the information transmission apparatus of the present invention;

FIG. 22 is a schematic view of an operation image of an address book in such information transmission apparatus; and FIG. 23 is a schematic view of an operation image for entering an access code in the use of an address book in such information transmission apparatus.

DETAILED DESCRIPTION OF THE PREFERRED EMBODIMENTS

In the following, the present invention will be clarified in detail by the embodiments thereof, with reference to the accompanying drawings.

(First Embodiment)

Figure 1:
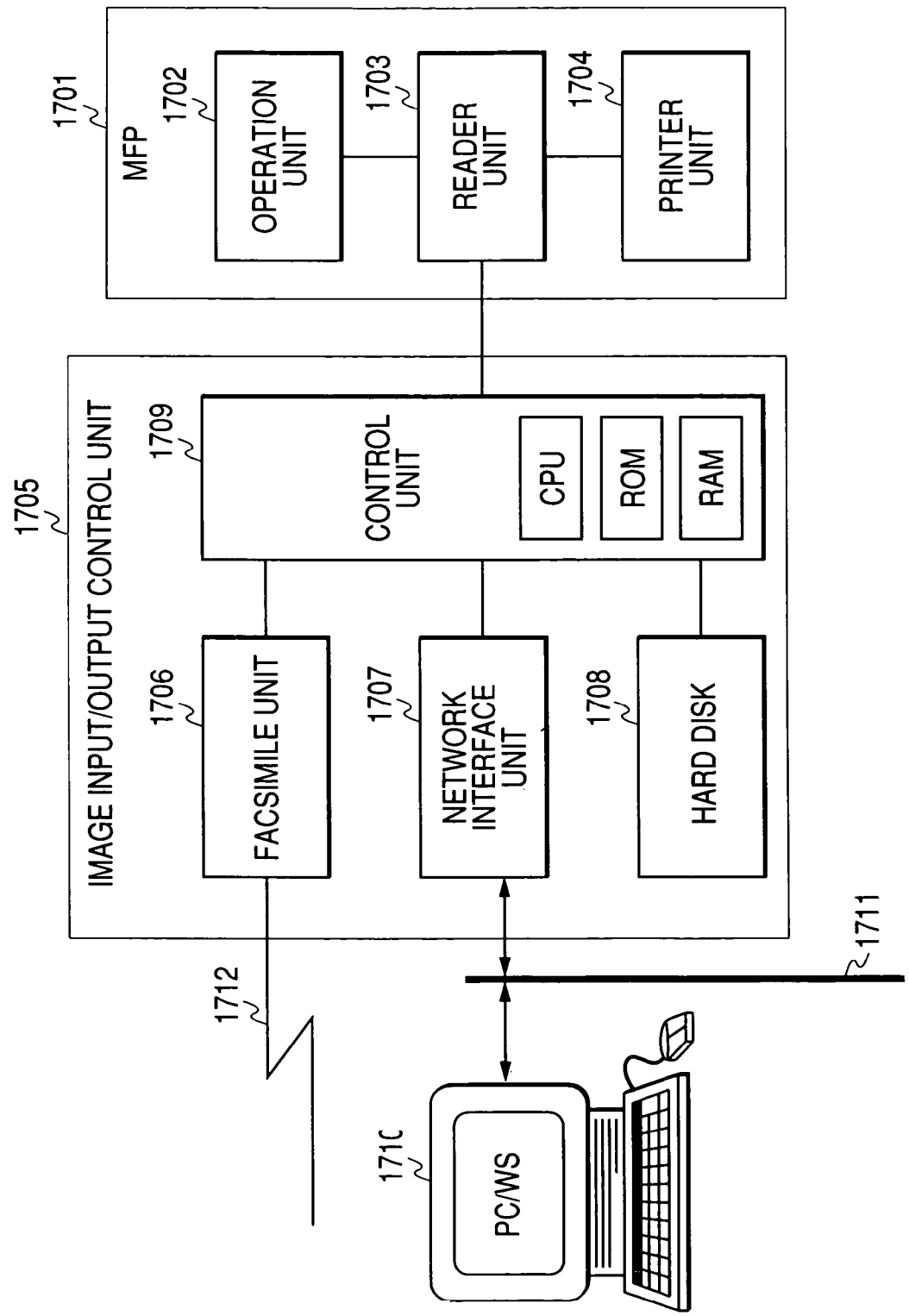
FIG. 1 is a block diagram showing a structure of a multi function peripheral (MFP) in which an information transmission apparatus of a first embodiment of the present invention is applicable.

FIG. 1 is a block diagram showing a structure of a multi-function peripheral (MFP) in which in which an information transmission apparatus of a first embodiment of the present invention is applicable.

Referring to FIG. 1, a main body 1701 of the MFP is constituted of an operation unit 1702, a read unit (image input means) 1703, and a printer unit (image output means) 1704.

The operation unit 1702 is provided with a display unit having a touch panel and various keys, and is used for operating the main body 1701 of the MFP and an image input/output control unit. The reader unit 1703 reads an image of an original, and outputs image data corresponding to the original image to the printer unit 1704 and the image input/output control unit 1705. The printer unit 1704 records, on a recording sheet, an image corresponding to the image data from the reader unit 1703 and the image input/output control unit 1705.

The image input/output control unit 1705 is connected to the reader unit 1703 and is constituted of a facsimile unit (image input means) 1706, a network interface unit 1707, a hard disk 1708 and a control unit 1709.

The facsimile unit 1706 extends compressed image data, received by facsimile (fax) through a telephone line 1712, and transfers the extended image data to the control unit 1709, and also compresses image data transferred from the control unit 1709 and executes facsimile transmission of the compressed image data through the telephone line. The compressed image data, received from the facsimile unit 1706 can be temporarily stored in the hard disk 1708.

The network interface unit 1707 is an interface with a local area network (LAN) 1711, transfers code data (PDL) representing an image transferred from a personal computer or a work station (PC/WS) 1710 through the LAN 1711, to the control unit 1709, which executes a development into image data recordable in the printer unit 1704. The network interface unit 1707 is connected to the internet or the like through the LAN 1711 and an unillustrated router and is capable of transmission and reception of e-mails and internet facsimile (I-fax).

The control unit 1709 controls data flow among the reader unit 1703, the facsimile unit 1706, the network interface unit 1707 and the hard disk 1708.

The control unit 1709 is provided with a CPU, a ROM and a RAM, and controls the entire MFP based on a program stored in the ROM or in another unillustrated storage medium. The RAM is used as a work area for the CPU.

The present embodiment has plural operation modes such as a copy mode for printing job data (also called image data), entered principally from the reader unit of the own apparatus, in the printer unit of the own apparatus through a memory unit such as the hard disk of the own apparatus; an external print mode for printing job data, received from an external apparatus such as a host computer or a destination facsimile apparatus, in the aforementioned printer unit through the aforementioned memory unit; a box mode for storing job data, output from the reader unit and/or the external apparatus, in a box (memory area provided for each user in the hard disk) of the aforementioned memory unit and outputting the job data of such box to an output unit such as the printer unit or a transmission unit in response to a user instruction from the operation unit of the own apparatus; and a transmission mode for transmitting job data entered into the own apparatus to an external apparatus. In the following there will be explained an information transmission apparatus as a multifunction peripheral, but the present embodiment is not limited to such case but is also applicable to a single-function information processing apparatus (also called single function peripheral or SFP) having at least the external transmission mode among the aforementioned plural function modes.

Also the present embodiment explains a structure of the apparatus of so-called integral configuration in which the reader unit and the printer unit are integrated, but it is likewise applicable to so-called separate type apparatus in which the units of the present embodiment or a part thereof is provided in a separate casing.

Figure 2:
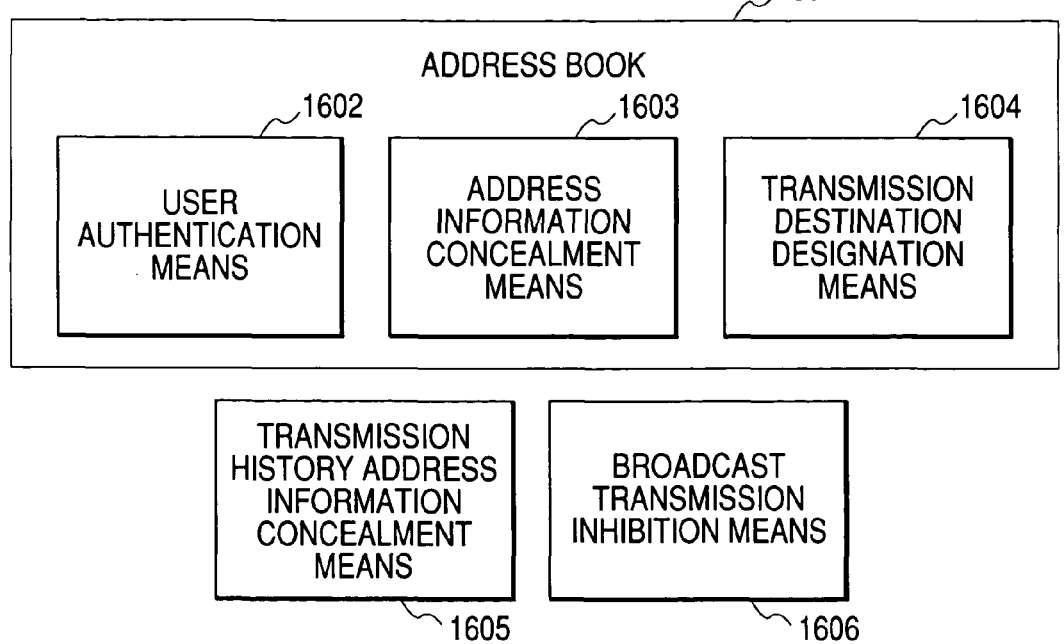
FIG. 2 is a block diagram showing a functional structure of an address book in the information transmission apparatus of the present invention.

FIG. 2 is a block diagram showing a functional structure relating to an address book of the information transmission apparatus of the present invention.

Referring to FIG. 2, an address book 1601 manages registration, for each access code, of an address (including a name and address information (destination such as an e-mail address, and a facsimile number (telephone number))) and also manages thus registered address. The address book 1601 is provided with user authentication means 1602, address information concealment means 1603, and transmission destination designation means 1604.

The user authentication means 1602 causes a user to input an access code and discriminates whether the user has a right to operate the address.

The address information concealment means 1603 conceals, in displaying the address information managed by the address book 1601 on the operation unit 1702, the address to a user who is discriminated as unauthenticated by the user authentication means 1602. In the present embodiment, the address information concealment means 1603 executes a mosaic process to a display area of the address information (e-mail address, facsimile number etc.) of the address displayed in the operation unit 1702 thereby rendering the characters illegible, but the concealing method is not particularly restricted. For example the concealment can also be achieved by replacing the address with other symbols (such as "*", "•" or "-").

The transmission destination designation means 1604 causes an address in the address book 1601 to be selected on the display unit of the operation unit 1702 and designated as a transmission destination in the transmission means for e-mail etc. The transmission destination designation means 1604 can also designate an address, which is displayed in a concealed state by the address information concealment means 1603, as the transmission destination.

The address book 1601 is realized by a control of the operation unit 1702 and the hard disk 1708 by a CPU of the control unit 1709 shown in FIG. 1 under execution of a program stored in a ROM or in the hard disk 1708.

The information transmission apparatus of the present invention is provided, separate from the address book 1601, with transmission history address information concealment means 1605 for using the address information of the address book 1601. The transmission history address information concealment means 1605 serves to conceal an address display portion in a history, in a history printing or a history display for example of a communication management report.

The transmission history address information concealment means 1605 is realized by a control of the operation unit 1702, the hard disk 1708 and the printer unit 1704 by the CPU of the control unit 1709 shown in FIG. 1 under execution of a program stored in a ROM or in the hard disk 1708.

The information transmission apparatus of the present invention is further provided with broadcast transmission inhibition means 1606. The broadcast transmission inhibition means 1606 inhibits a broadcast transmission in case of utilizing a destination protected by an access code from the address book 1601, in order to prevent that the protected address information is divulged to a third party by the broadcast transmission.

The broadcast transmission inhibition means 1606 is realized by an execution, by the CPU of the control unit 1709 shown in FIG. 1, of a program stored in a ROM or in the hard disk 1708.

In the following, functions of the address book 1601 will be explained in detail, with reference to schematic views of an operation image shown in FIGS. 3 to 14.

FIGS. 3 to 14 are schematic views showing examples of an operation image of the information transmission apparatus of the present invention, displayed on the display unit of the operation unit 1702 by the control unit 1709 shown in FIG. 1.

Figure 3:
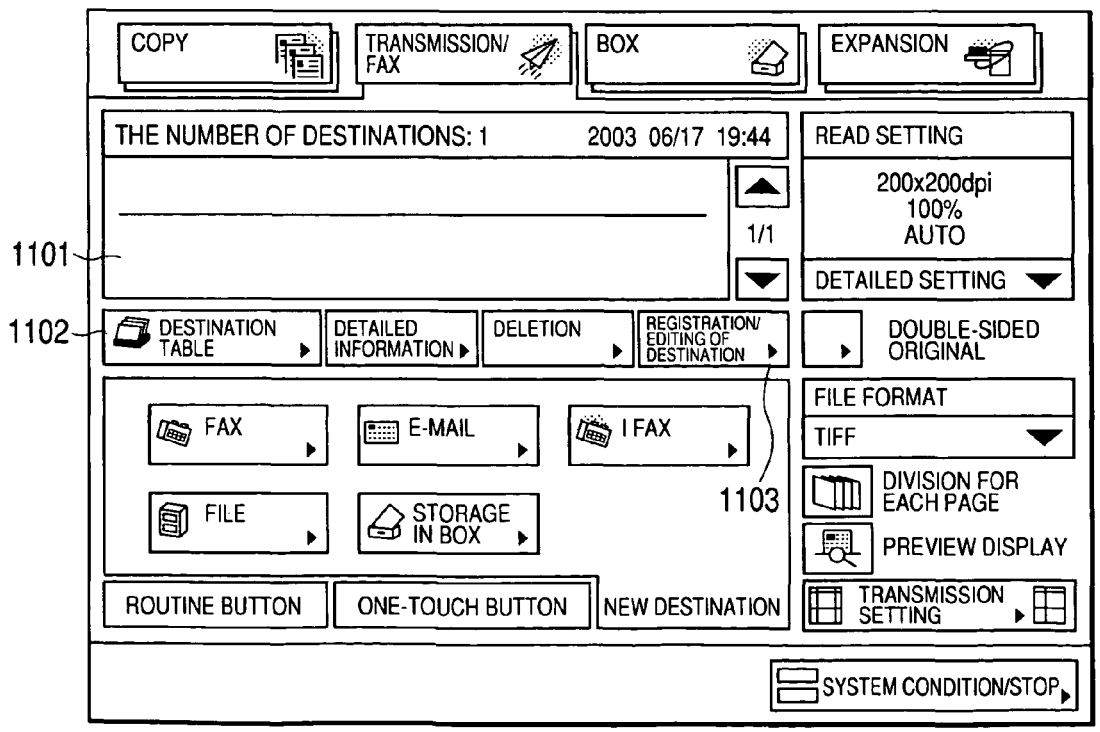
FIG. 3 is a schematic view showing an example of an operation image in the information transmission apparatus of the present invention.

At first, FIG. 3 shows a transmission/fax image.

Figure 4A:
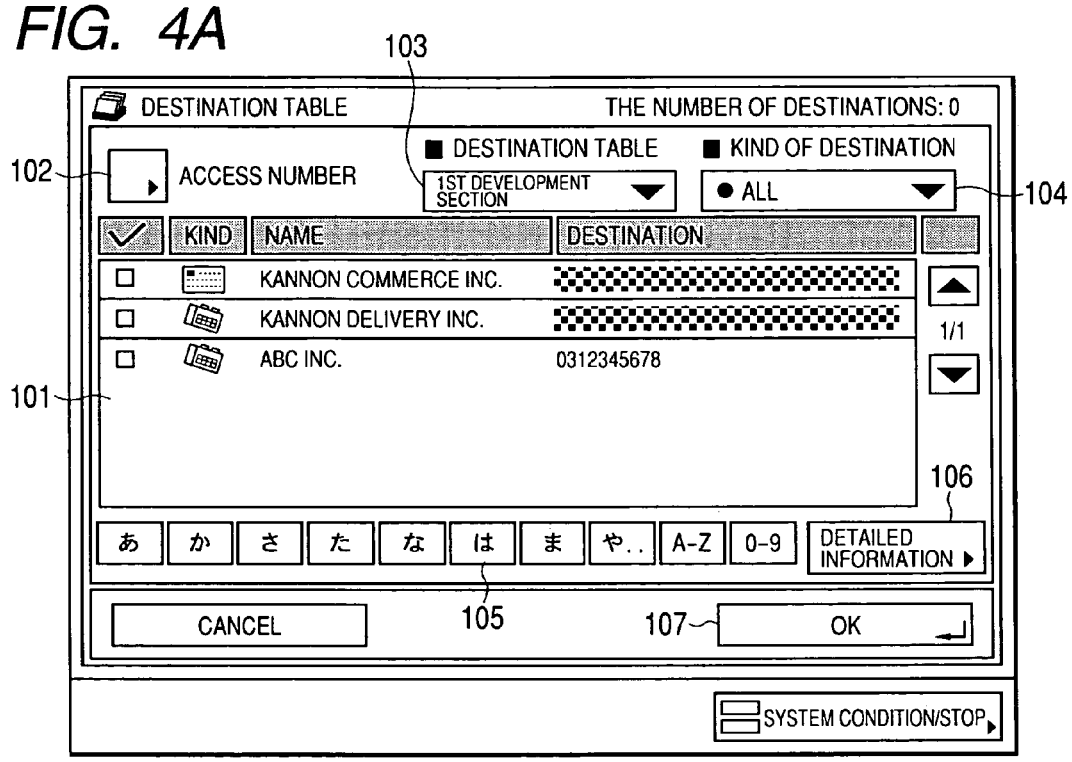
FIGS. 4A and 4B are schematic views showing examples of an operation image in the information transmission apparatus of the present invention.
Figure 4B:
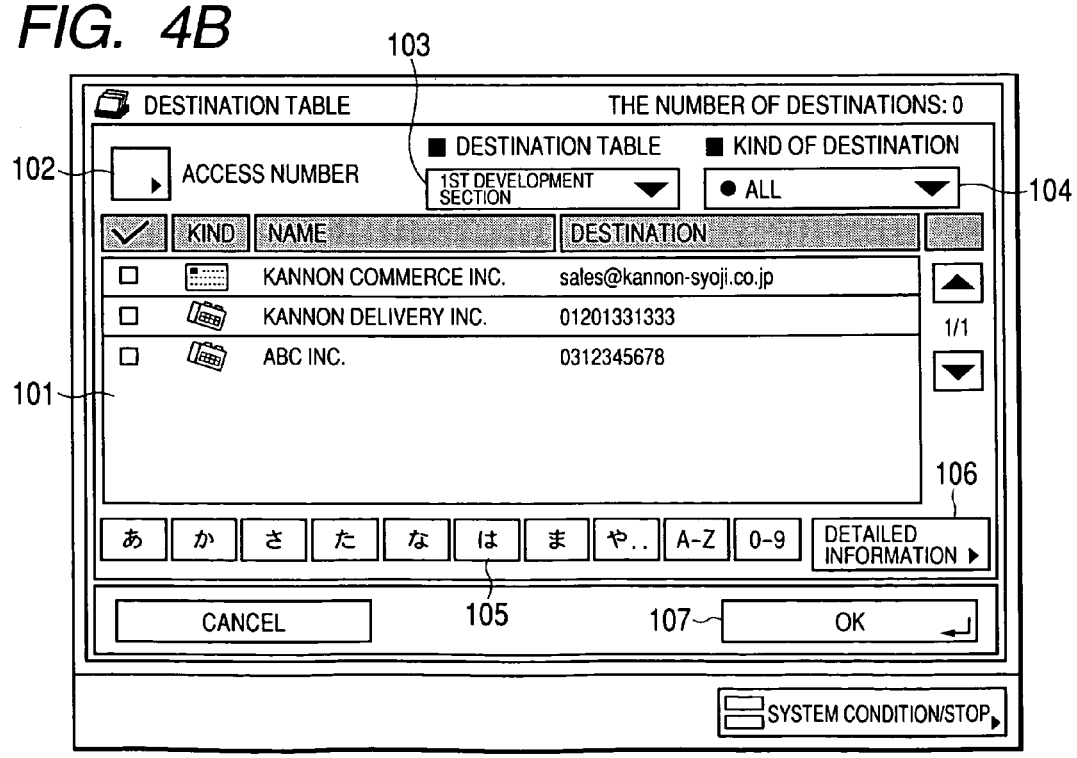

In the transmission/fax image shown in FIG. 3, a transmission destination list display portion 1101 display an address designated by a destination display image shown in FIGS. 4A and 4B.

1102 indicates a destination table button, and, in response to a touch (instruction) thereon, the control unit 1709 executes an address display control on the display unit of the operation unit 1702, whereupon the display of the operation unit 1702 is shifted to the address table image shown in FIGS. 4A and 4B. The address table image constitutes the address book 1601 shown in FIG. 2.

Figure 8:
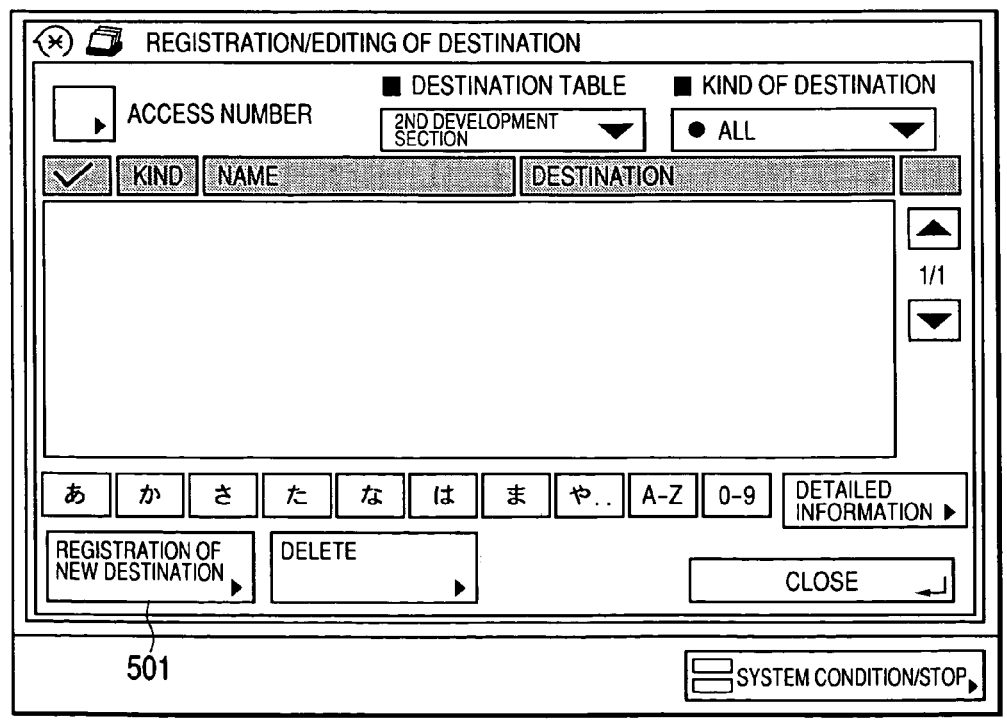
FIG. 8 is a schematic view showing an example of an operation image in the information transmission apparatus of the present invention.

1103 indicates a destination registration/editing button, and, in response to a touch (instruction) thereon, the control unit 1709 shifts the display unit of the control unit 1702 to a destination registration/editing image shown in FIG. 8.

At first a display operation of an address will be explained with reference to FIGS. 4A to 7.

At the center of the destination table image shown in FIGS. 4A and 4B, there is displayed an address list 101. In the address list 101, one row corresponds to a destination, and displays, from the left-hand end, an icon indicating a kind of the address, then a name input at the address registration, and a destination address (address information) itself. The destination address (address information) is a mail address in case of e-mail, or a fax telephone number in case of fax.

The address list 101 is controlled by the address information concealment means 1603 shown in FIG. 2 in such a manner that the address information of the address for which an access number (access code) is set, until such access number is input. In the illustrated example, an address book of a 1st Development Section registers "Kannon Commerce Inc.", "Kannon Delivery Inc." and "ABC Inc.", among which access numbers are set for Kannon Commerce Inc. and Kannon Delivery Inc.

FIG. 4A shows a state prior to the input of the access number (or when the input access number is erroneous), wherein Kannon Commerce Inc. and Kannon Delivery Inc., for which access numbers are set, are displayed with concealed address information (rendered illegible by a mosaic process) while ABC Inc. is displayed with the address information in a legible state as no access number is set.

FIG. 4B shows a state after the input of the access number, wherein Kannon Commerce Inc. and Kannon Delivery Inc., for which access numbers are set, are displayed with address information in a legible state, like ABC Inc. for which no access number is set.

The address list 101 constitutes the transmission destination designation means 1604 shown in FIG. 2, and a transmission destination can be designated by touching an address displayed on the address list 101. Also an address displayed with the address information in the concealed state, such as Kannon Commerce Inc. or Kannon Delivery Inc. as shown in FIG. 4A, can also be designated as the transmission destination by a touch on the name.

In an upper left portion of the destination table image shown in FIGS. 4A and 4B, there is provided an access number button 102 for inputting an access number for releasing restriction (concealment) of the address display. In response to a touch (instruction) to the access number button 102, the control unit 1709 displays a number input dialog image as shown in FIG. 5.

Figure 5:
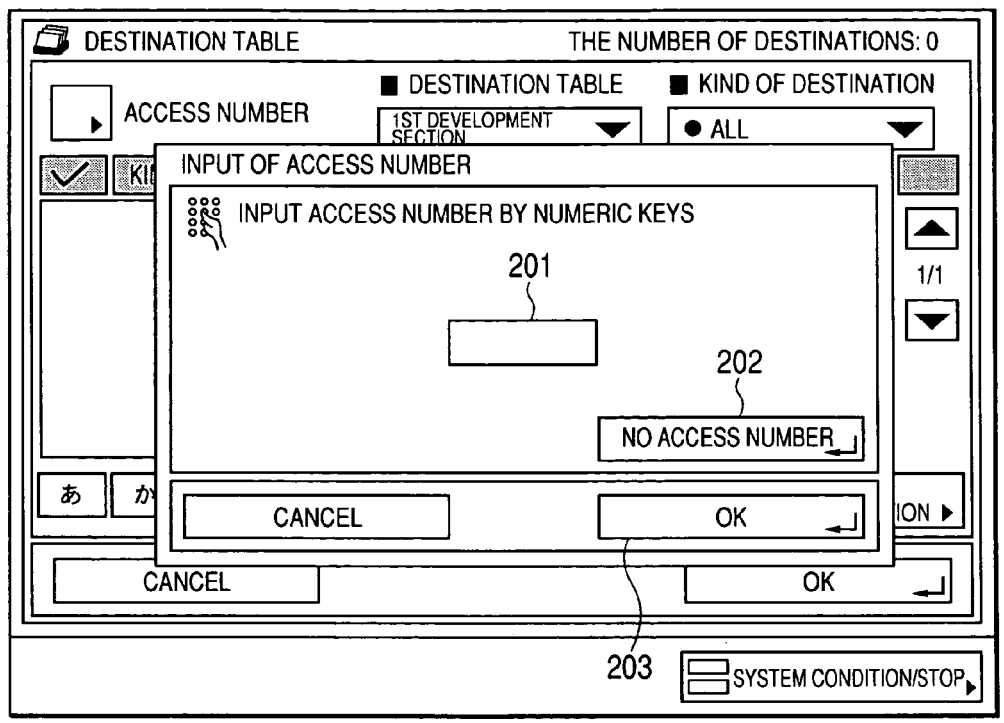
FIG. 5 is a schematic view showing an example of an operation image in the information transmission apparatus of the present invention.

In response to an input of an access number in an access number input column 201 of the number input dialog shown in FIG. 5 and a touch (instruction) on an OK key 203, the control unit 1709 displays, for addresses having a matching access number, the destination (address information such as an e-mail address or a fax number), in the list (address list 101), but, in addresses having a non-matching access number, does not displays the destination (address information) for example by a mosaic process in the list portion (address list 101) (thus the kind and the name alone being displayed). The number input dialog shown in FIG. 5 constitutes the user authentication means 1602 shown in FIG. 2.

The number input dialog image shown in FIG. 5 also has a no-access number button 202, and in response to a touch (instruction) thereon, the control unit 1709 displays, for addresses having no access number, the destination (address information), in the list (address list 101), but, in addresses having an access number, does not displays the destination for example by a mosaic process in the list portion (address list 101) (thus the kind and the name alone being displayed).

Figure 6:
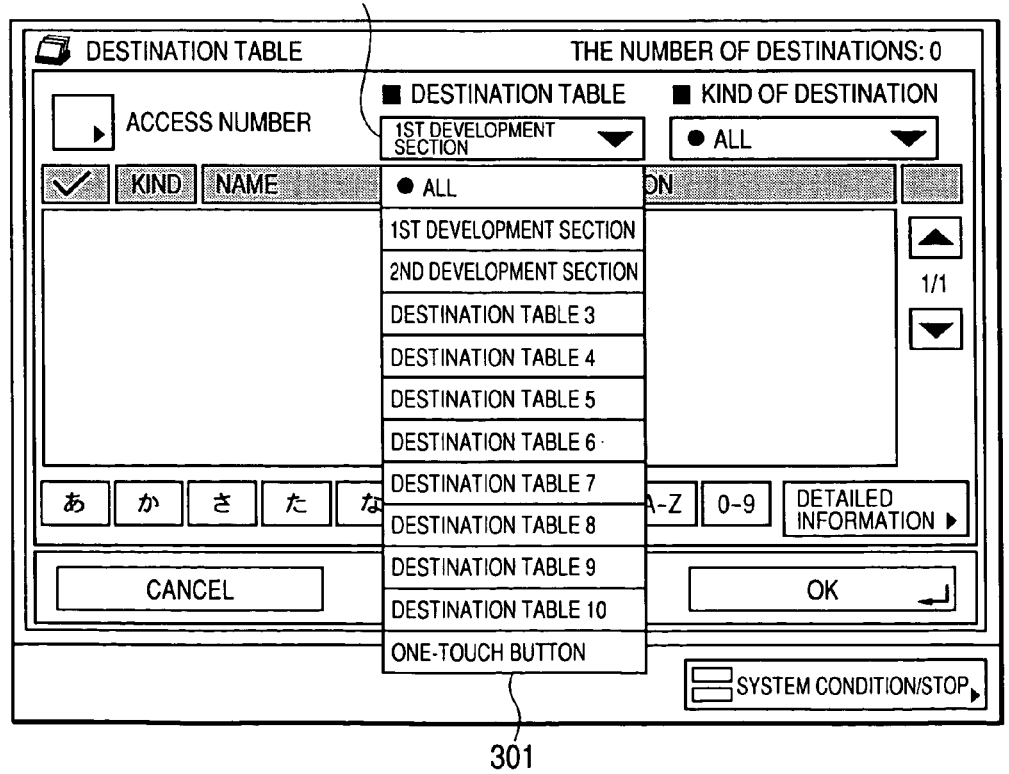
FIG. 6 is a schematic view showing an example of an operation image in the information transmission apparatus of the present invention.

In the destination table image shown in FIGS. 4A and 4B, a sub-address selection list 103 is provided for selecting sub-addresses formed by dividing the address book into plural sections, and, in response to a touch (instruction) of the sub-address selection list 103 by the operator, the control unit 1709 displays a sub-address list (switching pull-down list 301) as shown in FIG. 6. FIG. 6 shows a state where a sub-address book titled as "1st Development Section" is instructed. The sub-address selection list 103 can switch display of address books for person, for a section, for a group etc.

Figure 7:
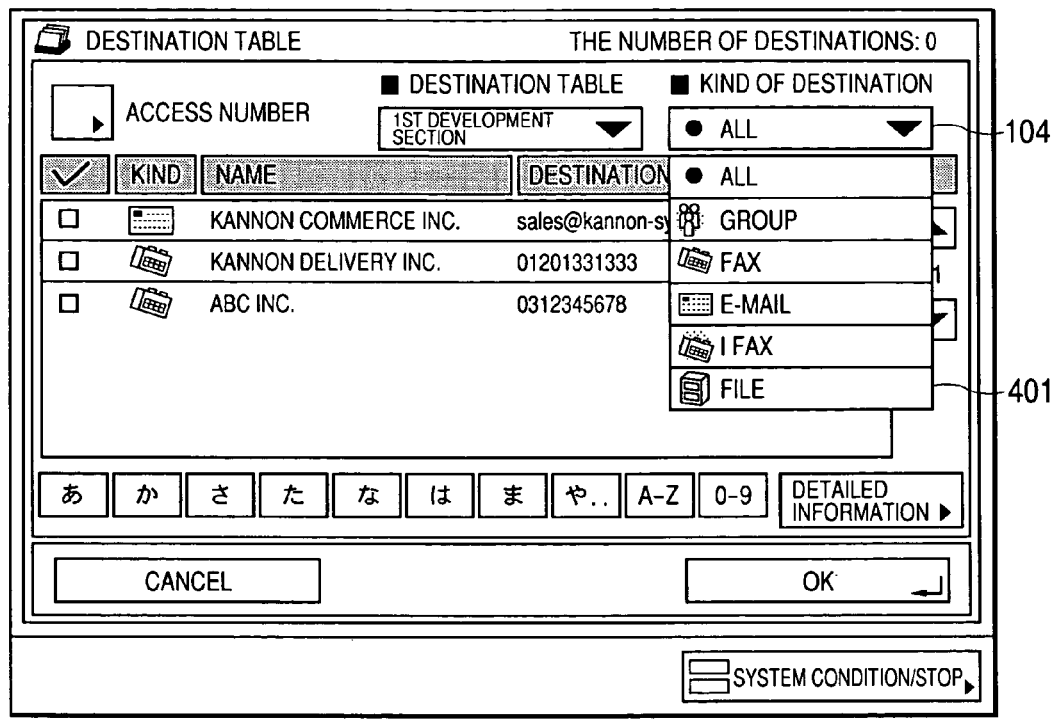
FIG. 7 is a schematic view showing an example of an operation image in the information transmission apparatus of the present invention.

Also in the destination table image shown in FIGS. 4A and 4B, a destination kind selection list 104 is provided for switching the display of the address book by the kind of destination. In response to a touch (instruction) of the destination kind selection list 104 by the operator, the control unit 1709 displays a kind list 401 as shown in FIG. 7. Thus the operator can select the kind of the address to be displayed. In FIG. 7, the destinations of all the kinds are displayed.

Also in a lower part of the destination table image shown in FIGS. 4A and 4B, there are provided name filter buttons 105 constituted of small buttons "あ", "か", ..., "や", "A-Z" and "0-9". The name filter buttons 105 are used for filtering the addresses by the address name, and, for example a button "か" is depressed, the control unit 1709 displays only the addresses starting with a letter "か" (namely starting with か, き, く, けor こ) in the list. Here, it should be noted that "あ", "か", "や", "き", "く", "け" and "こ" are Japanese syllabary characters.

107 indicates an OK button, and, in response to a touch (instruction) thereof, the control unit 1709 displays the transmission/fax image shown in FIG. 3. In this state, a transmission destination list display portion 1101 of the transmission/fax image in FIG. 3 displays an address instructed in the address list 101.

In the following, there will be explained an address registration operation with reference to operation images shown in FIGS. 8 to 11.

Figure 9:
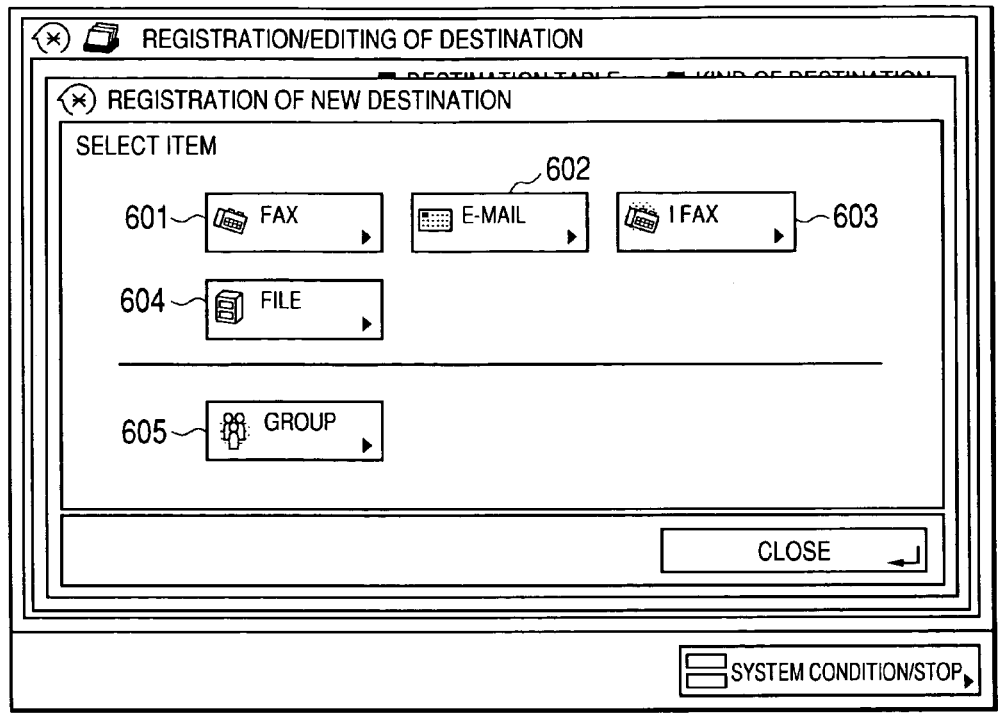
FIG. 9 is a schematic view showing an example of an operation image in the information transmission apparatus of the present invention.

A destination registration/editing image shown in FIG. 8 includes, in a lower part thereof, a new destination registration button 501, and, in response to a touch (instruction) thereof, the control unit 1709 displays a new destination registration image shown in FIG. 9.

The MFP selectably supports by fax, e-mail, internet fax, and a file transmission by SMB or FTP, and, in the new destination registration image shown in FIG. 9, the operator can instruct an arbitrary protocol by a fax selection button 601, an e-mail selection button 602, an internet fax (I-fax) selection button 603, or an SMB/FTP file transmission selection button 604. Also a group selection button 605 is provided for registering plural destinations collectively as a group destination.

Figure 10:
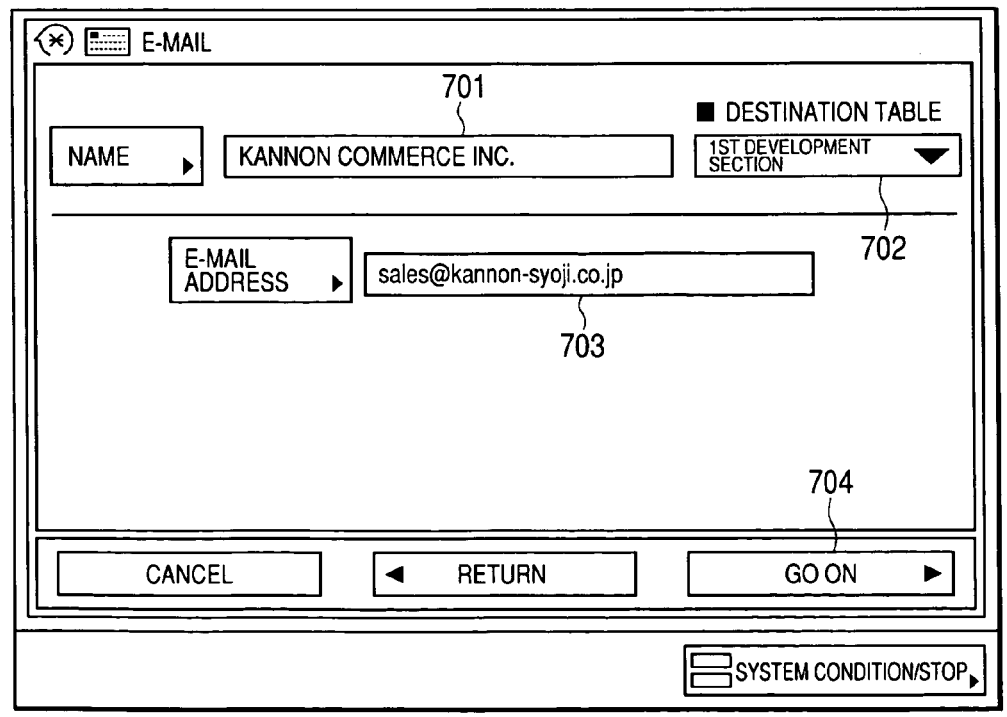
FIG. 10 is a schematic view showing an example of an operation image in the information transmission apparatus of the present invention.

In response to an instruction (touch) of any of the buttons 601-605, the control unit 1709 displays a registration image. FIG. 10 shows an e-mail registration image which is displayed when the e-mail selection button 602 is selected.

In the registration image shown in FIG. 10, a name input box 701 is used for inputting a name to be displayed on the address book as an attribute in all the addresses, and arbitrary characters can be input by an unillustrated software keyboard displayed by the control unit 1709 on the operation unit 1702.

In an upper right portion of the registration image shown in FIG. 10, there is provided a sub-address list 702 for selecting sub-addresses formed by dividing the address book into plural sections, and a sub-address selection allows to register the address classified into a desired sub-address. FIG. 10 shows a state where a sub-address titled as "1st Development Section" is instructed.

The registration image shown in FIG. 10 is provided, in a central part, with an e-mail address input box 703, in which an e-mail address can be input by an unillustrated software keyboard displayed on the operation unit 1702.

Figure 11:
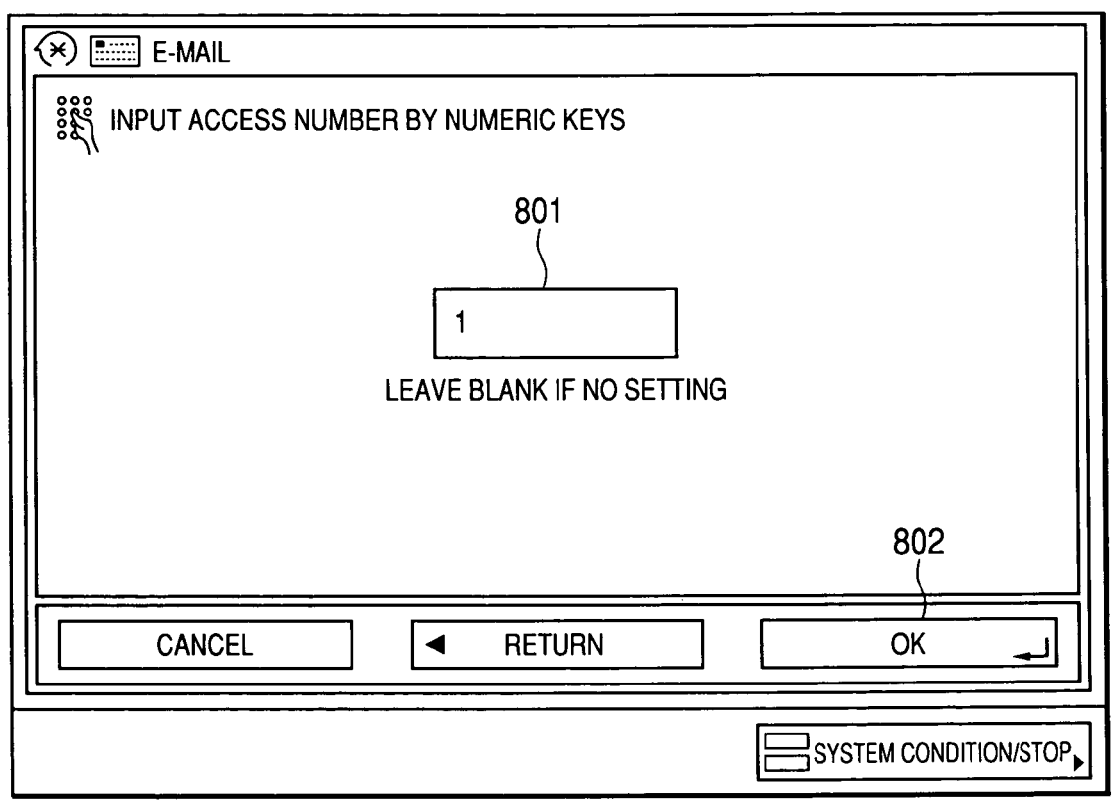
FIG. 11 is a schematic view showing an example of an operation image in the information transmission apparatus of the present invention.

704 indicates a "next" button, and, in response to an instruction (touch) thereof after the input operation, the control unit 1709 displays an access number input image shown in FIG. 11.

In the access number input image shown in FIG. 11, an access number input box 801 is used for inputting an access number to be set for the newly registered address. 802 indicates an OK key, and, in response to an instruction thereof, the control unit 1709 stores the destination information (including the access number in case an access number is set in the access number input box 801) in an internal memory such as a RAM or in the hard disk 1708.

In case of a setting (namely not blank) in the access number input box 801, the control unit 1709 displays, in response to a request, only addresses having a matching access number in the address list from the address book. Thus, there can be avoided a drawback that the address becomes visible to anybody when the address list is displayed from the address book.

Also in case the OK key 802 is instructed without the access number setting in the access number input box 801 (box being left blank), the control unit 1709 displays the corresponding address in response to a request. Thus, an address that is disclosable to anybody can be disclosed to a user who does not know the access number, by leaving the access number as blank.

In the following, an address information display control procedure in the prior technology and in the information transmission apparatus of the invention will be explained with reference to FIGS. 12 to 16.

The transmission/fax image shown in FIG. 3 enables a transmission of a scanned image or a stored image for example by e-mail, and, for selecting a transmission destination from the address book, the user touches a destination table button 1102 in this image to display the address book.

Prior to the explanation of the address information display control procedure in the information transmission apparatus of the invention, there will be explained, with reference to FIG. 12, an address information display control procedure in a prior information transmission apparatus.

Figure 12:
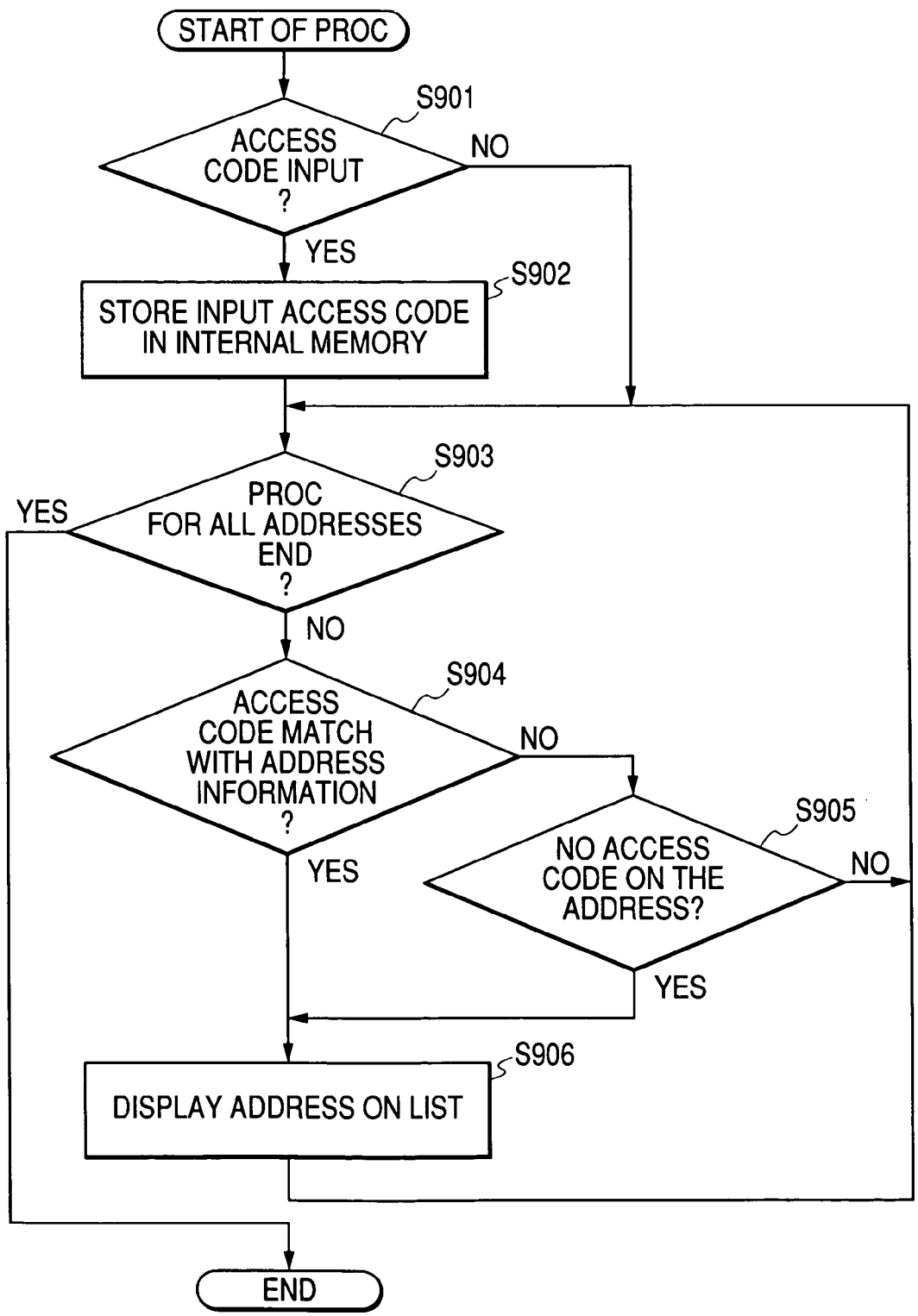
FIG. 12 is a flow chart showing an example of an address information display control process in a prior information transmission apparatus.

FIG. 12 is a flow chart showing an example of the address information display control procedure in a prior information transmission apparatus, wherein S901-S906 indicate process steps.

At first, when the destination table button 1102 shown in FIG. 3, the OK key 203 in the number input dialog image shown in FIG. 5, the no-access number key 202 in the number input dialog image shown in FIG. 5 or the switching of the sub-address (address book) by the sub-address selection list 103 is selected, the control unit 1709 activates the process of the present flow chart, and discriminates whether an access code has been input by the user (S901).

In case an input of an access code is identified in the step S901 (namely in case an access code in input in the access number input box 201 shown in FIG. 5 and the OK key 203 is touched), the input access code is stored in an internal memory (RAM in the control unit 1709) (S902), and the sequence proceeds to a step S903. The access code is used for discriminating whether or not to display each address (in a following step S904).

On the other hand, in case an access code input is identified absent in the step S901 (namely in case the OK key 203 is touched without an input of an access code in the access number input box 201 shown in FIG. 5, or in case the no-access number key 202 shown in FIG. 5 is touched, or in case the destination table button 1102 in FIG. 3 is selected), the sequence proceeds to a step S903.

Then the control unit 1709 repeats a following process for all the addresses.

In a step S903, the control unit 1709 discriminates whether a following process (S904-S906) has been executed on all the addresses, and, if not, extracts an address information and discriminates a matching with the access code input by the user (S904).

In case a step S904 identifies a coincidence, the address is displayed on a list (address list 101 shown in FIGS. 4A and 4B) (S906) and the sequence returns to the step S903.

On the other hand, in case the step S904 identifies an absence of coincidence, there is further discriminated whether an access code is registered on this address (S905), and, in case an absence of registration of the access code on this address, indicating the availability to anybody, the address information is displayed on a list (address list 101 shown in FIGS. 4A and 4B) (S906), whereupon the sequence returns to the step S903.

On the other hand, in case the step S905 identifies that an access code is registered for this address, the sequence returns to the step S903 without displaying the address information on the list (address list 101 shown in FIGS. 4A and 4B).

The sequence is terminated when the aforementioned process (S904-S906) is repeated for all the addresses. Thus, when the step S903 identifies that the process of the steps S904-S906 has been executed for all the addresses, the sequence is terminated.

FIGS. 13A and 13B are schematic views showing a destination table image displayed on the display unit of the operation unit 1702 by the address information display control procedure in the prior information transmission apparatus shown in FIG. 12, wherein FIG. 13A shows a case of no input of an access number (or an error in the input access number), while FIG. 13B shows a case of an input of an access number. Also in this example, the address book registers Kannon Commerce Inc., Kannon Delivery Inc. and ABC Inc., among which access numbers are set for Kannon Commerce Inc. and Kannon Delivery Inc. only.

A list shown in FIG. 13A does not display Kannon Commerce Inc. and Kannon Delivery Inc. for which the access number is set but only displays ABC Inc. for which the access number is not set. On the other hand, a list shown in FIG. 13B displays the address information of both Kannon Commerce Inc. and Kannon Delivery Inc. for which the access number is set and ABC Inc. for which the access number is not set.

In this manner, the prior address book display control procedure does not display any information at all, on the list, for an address for which the access number is not input, so that the user not having the access code cannot recognize the presence itself of such address in the address book, and is unable to utilize the address in any way. Thus, as explained in the problems to be solved by the invention, it is not possible to achieve the protection and the convenience of the address information at the same time in a situation of causing the address, protected by the access code, to be temporarily utilized by another person.

In the following, the address information display control procedure in the information transmission apparatus of the invention will be explained.

Figure 14:
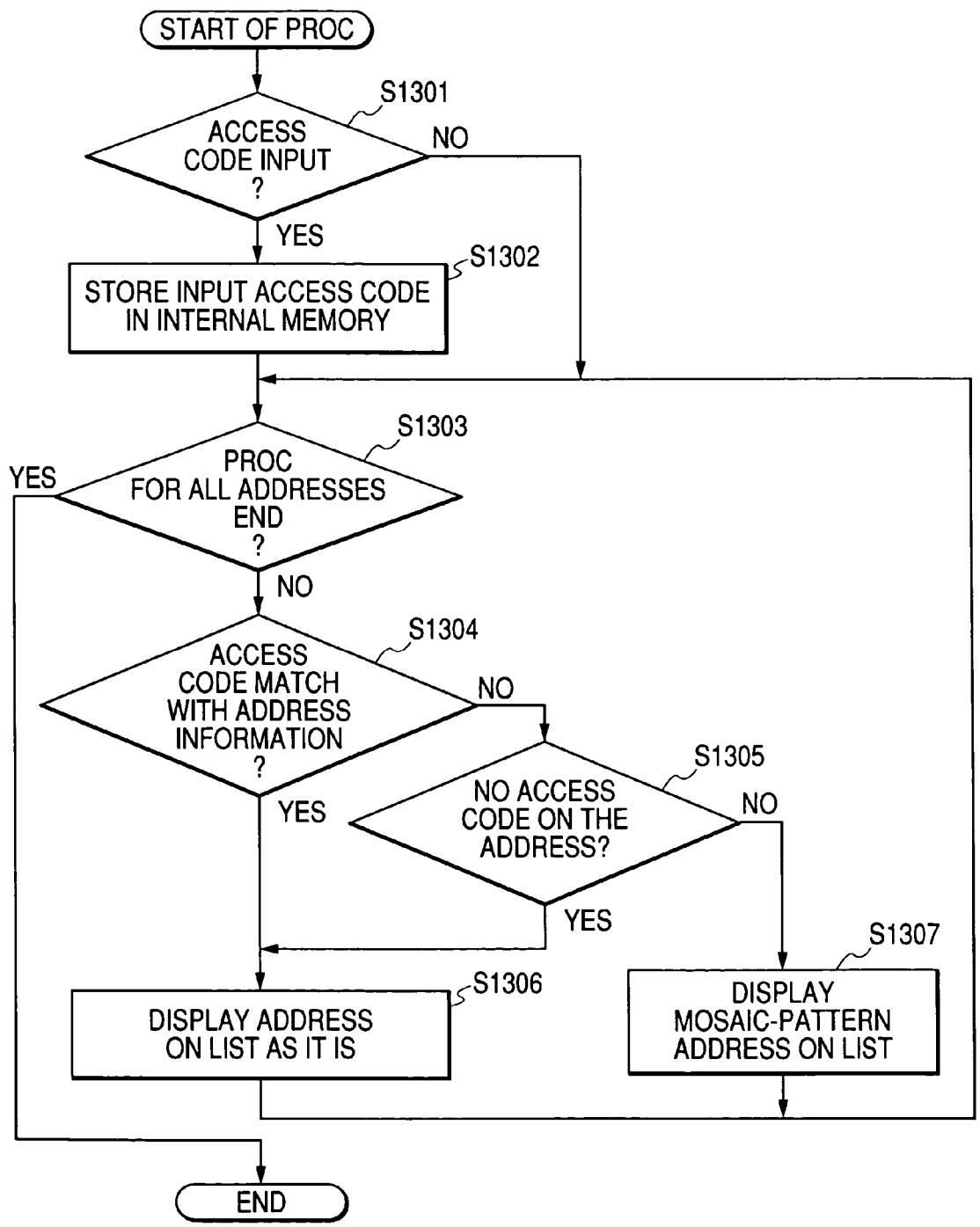
FIG. 14 is a flow chart showing an example of a first control process in the information transmission apparatus of the present invention.

FIG. 14 is a flow chart showing an example of a first control procedure in the information transmission apparatus of the present invention, and corresponds to the address information display control procedure in the information transmission apparatus of the invention. More specifically, in case of non-matching of the access code input by the operator (including a case of absence of access code), a specific destination part is concealed from the user while a name etc. are rendered visible to the user thereby achieving protection and convenience of the information at the same time. This flow chart is executed by the CPU of the control unit 1709 shown in FIG. 1, according to a program stored in the ROM or in the hard disk 1708. S1301-S1307 indicate process steps.

At first, when the destination table button 1102 shown in FIG. 3, the OK key 203 in the number input dialog image shown in FIG. 5, the no-access number key 202 in the number input dialog image shown in FIG. 5 or the switching of the sub-address (address book) by the sub-address selection list 103 is selected, the control unit 1709 activates the process of the present flow chart, and discriminates whether an access code has been input by the user (S1301).

In case an input of an access code is identified in the step S1301 (namely in case an access code in input in the access number input box 201 shown in FIG. 5 and the OK key 203 is touched), the input access code is stored in an internal memory (RAM in the control unit 1709) (S1302), and the sequence proceeds to a step S1303. The access code is used for discriminating whether or not to display each address (in a following step S1304).

On the other hand, in case an access code input is identified absent in the step S1301 (namely in case the OK key 203 is touched without an input of an access code in the access number input box 201 shown in FIG. 5, or in case the no-access number key 202 shown in FIG. 5 is touched, or in case the destination table button 1102 in FIG. 3 is selected), the sequence proceeds to a step S1303.

Then the control unit 1709 repeats a following process for all the addresses.

In a step S1303, the control unit 1709 discriminates whether a following process (S1304-S1306) has been executed on all the addresses, and, if not, extracts an address information and discriminates a matching with the access code input by the user (S1304).

In case a step S1304 identifies a coincidence, the address is displayed on a list (address list 101 shown in FIGS. 4A and 4B) (S1306) and the sequence returns to the step S1303.

On the other hand, in case the step S1304 identifies an absence of coincidence, there is further discriminated whether an access code is registered on this address (S1305), and, in case an absence of registration of the access code on this address, indicating the availability to anybody, the address information is displayed on a list (address list 101 shown in FIGS. 4A and 4B) (S1306), whereupon the sequence returns to the step S1303.

On the other hand, in case the step S1305 identifies that an access code is registered for this address, indicating that the user has no right to see the details of the address. In such case, it is necessary to protect the information in such a manner that the address can be used but the details cannot be known. More specifically, a step S1307 displays the address information on the list (address list 101 shown in FIGS. 4A and 4B) in a state in which the address display portion such as a mail address or a telephone number is unreadable to the user (but the name etc. being displayed in a readable state), whereupon the sequence returns to the step S1303. The present embodiment shows a configuration in which the aforementioned "unreadable" state is realized by displaying the address information in a mosaic pattern, but any other address concealing method may be adopted, such as a method of not displaying the address information. Even though the address information is concealed, the user can utilize the address by looking at the name thereof.

The sequence is terminated when the aforementioned process (S1304-S1306) is repeated for all the addresses. Thus, when the step S1303 identifies that the process of the steps S1304-S1306 has been executed for all the addresses, the sequence is terminated.

In the present embodiment, both in a case where a transmission setting image for data transmission to a registered destination is displayed on the operation unit 1702 in a state without concealing the address information by the execution of the step S1306 (corresponding to a case of displaying an image in FIG. 15B) and in a case where a transmission setting image for data transmission to a registered destination is displayed in a state concealing the address information by the execution of the step S1307 (corresponding to a case of displaying an image in FIG. 15A), the control unit 1709 controls the destination, to which the data are to be transmitted, selectably by the user through such transmission setting image, in order to transmit desired data from the scanner (reader unit 1703) of the hard disk 1708 of the present apparatus to the destination selected by the user through such image.

Thus, in both cases where the step S1306 or the step S1307 is executed, the sequence can thereafter proceed to a process step of causing the user to select the destination through the transmission setting image, and, in response to the selection of the destination by the user, a process step of data transmission to such destination.

Figure 15A:
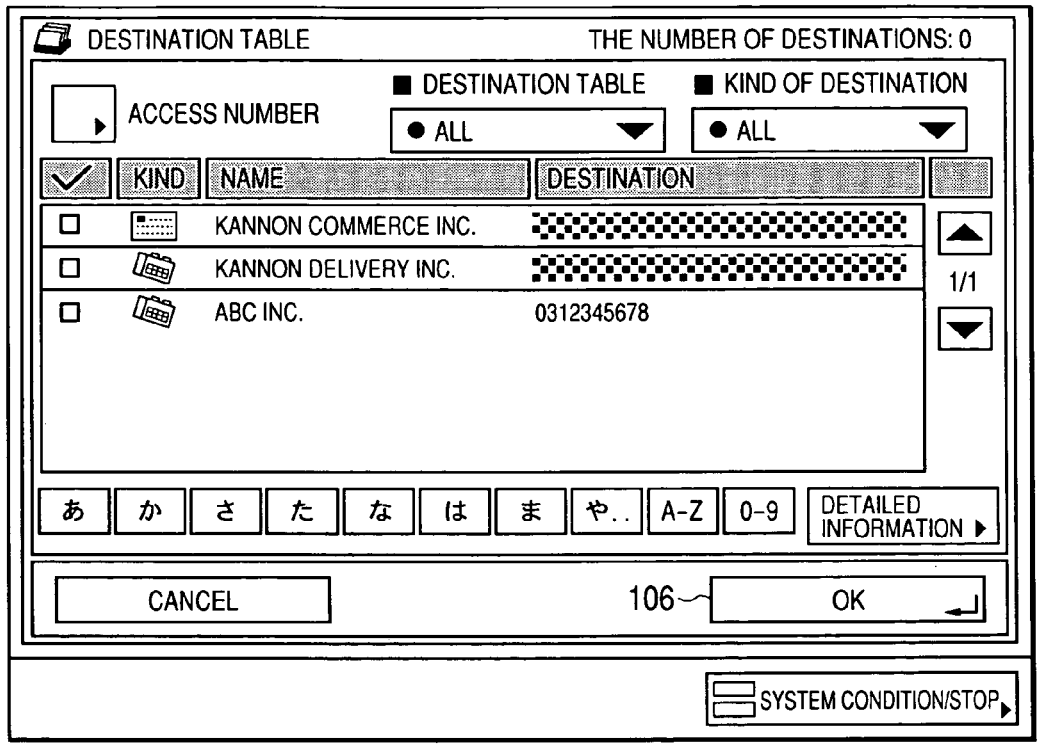
FIGS. 15A and 15B are schematic views showing a destination image displayed in a display of an operation unit by an address information display control process in the information transmission apparatus of the present invention shown in FIG. 14.
Figure 15B:
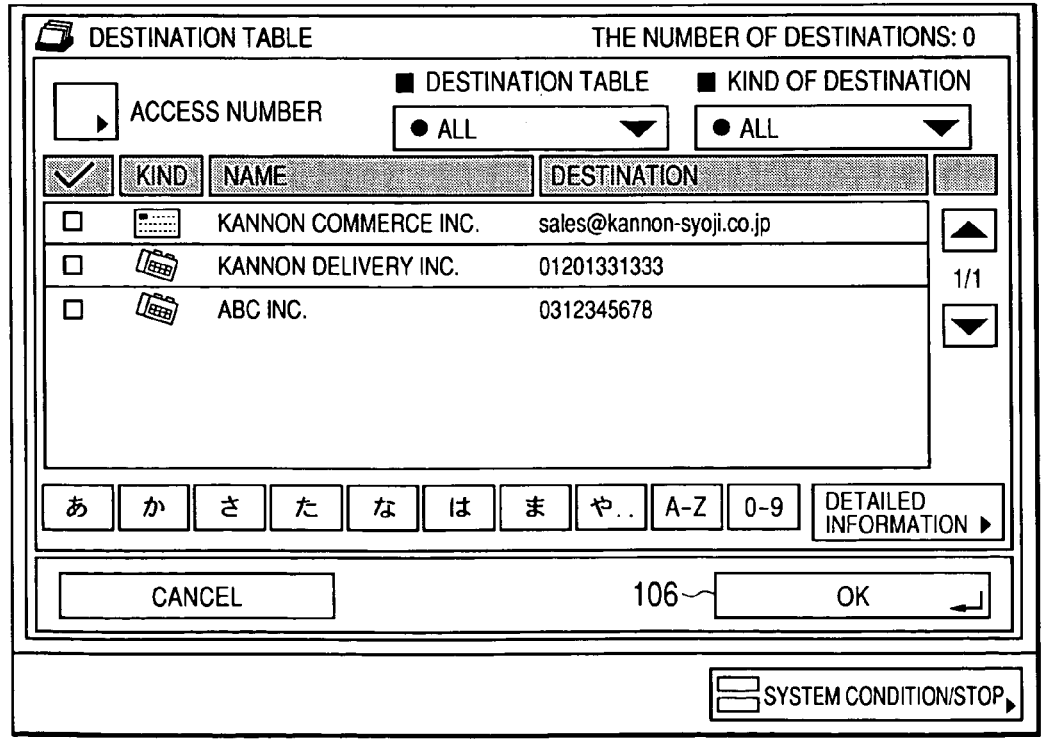

FIGS. 15A and 15B are schematic views showing a destination table image displayed on the display unit of the operation unit 1702 by the address information display control procedure in the information transmission apparatus of the invention shown in FIG. 14, wherein FIG. 15A shows a case of no input of an access number (or an error in the input access number), while FIG. 15B shows a case of an input of an access number. Also in this example, the address book registers Kannon Commerce Inc., Kannon Delivery Inc. and ABC Inc., among which access numbers are set for Kannon Commerce Inc. and Kannon Delivery Inc. only.

In a list shown in FIG. 15A, Kannon Commerce Inc. and Kannon Delivery Inc. for which the access number is set, are displayed with the destination only in an unreadable state (concealed state) by a mosaic pattern, while ABC Inc. for which the access number is not set, is displayed with the destination in a readable state. On the other hand, a list shown in FIG. 15B displays the address information of both Kannon Commerce Inc. and Kannon Delivery Inc. for which the access number is set and ABC Inc. for which the access number is not set.

Figure 16A:
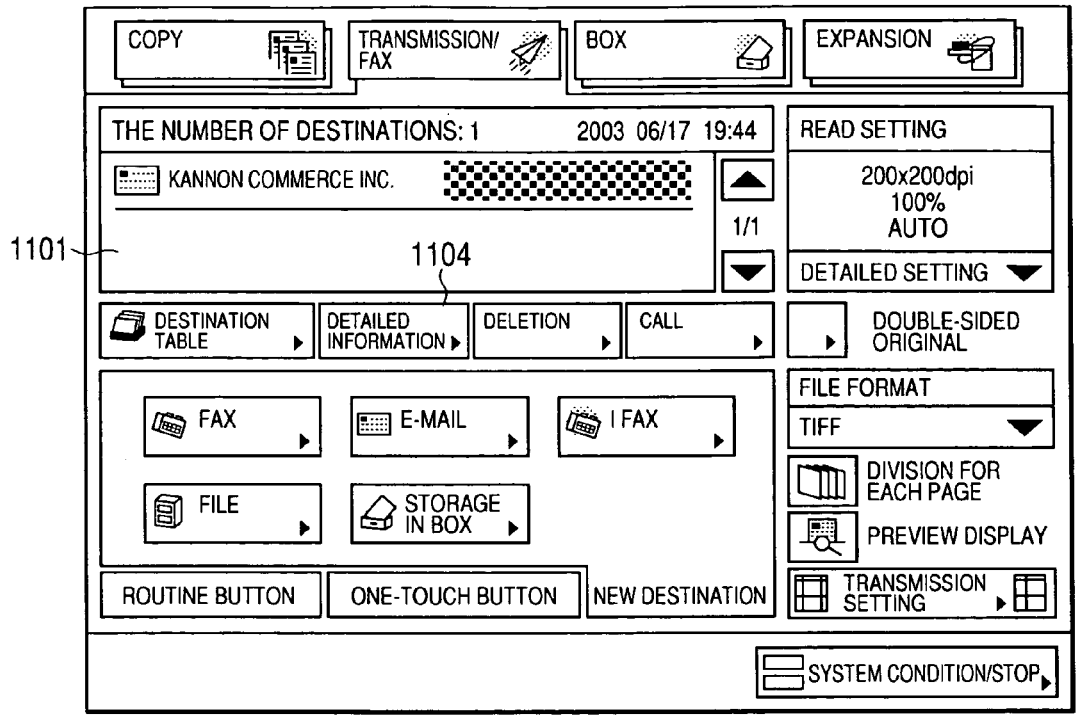
FIGS. 16A and 16B are schematic views showing a transmission/facsimile image after an address designation by the address information display control process in the information transmission apparatus of the present invention shown in FIG. 14.
Figure 16B:
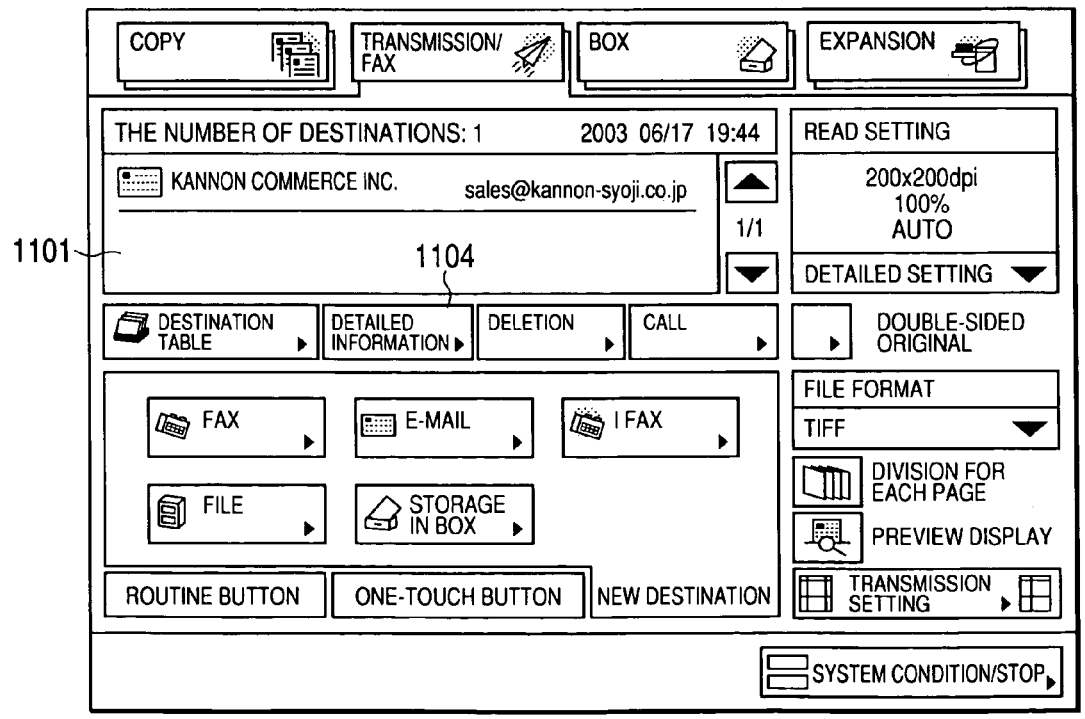

In this manner, even in case that an access number is not input (or an input access number is erroneous), the address name is selectably displayed on the list in a state where the address information is concealed, so that the address can be understood as to its destination without disclosing the detailed content (address information) of the destination to other persons. More specifically, even a user not knowing the access number can under the name of the destination and can utilize such address by designating it as the destination of transmission. FIGS. 16A and 16B shows transmission/fax images after the address designation.

FIGS. 16A and 16B are schematic views showing a transmission/fax image after an address designation by the address information display control procedure in the information transmission apparatus of the invention. There is illustrated a situation where Kannon Commerce Inc. is designated. FIG. 16A shows a case of no input of an access number (or an error in the input access number), while FIG. 16B shows a case of an input of an access number.

As shown in FIGS. 16A and 16B, a transmission destination list display portion 1101 at the center of the transmission/fax image displays an address selected (designated) by the user.

In FIG. 16A where no access code is input, namely in case the destination is designated in FIG. 15A, in the destination unauthorized for the details (for example destination of Kannon Commerce Inc.), a detailed portion (address information) of the destination is displayed in a mosaic pattern. On the other hand, in FIG. 16B where an access code is input, namely in case the destination is designated in FIG. 16B, a detailed portion (address information) of the destination is also displayed readably.

In a state where a destination for information transmission is designated in the transmission/fax image shown in FIGS. 16A and 16B, in response to a depression of an unillustrated start button on the operation unit 1702, the control unit 1709 controls an information transmission based on a protocol of the destination of the information transmission (fax, e-mail or I-fax (registered in the new destination registration image shown in FIG. 9). In case of facsimile, a facsimile transmission is executed by the facsimile unit 1706, and, in case of e-mail or I-fax, a transmission by e-mail or I-fax is executed by the network interface unit 1707.

Figure 17A:
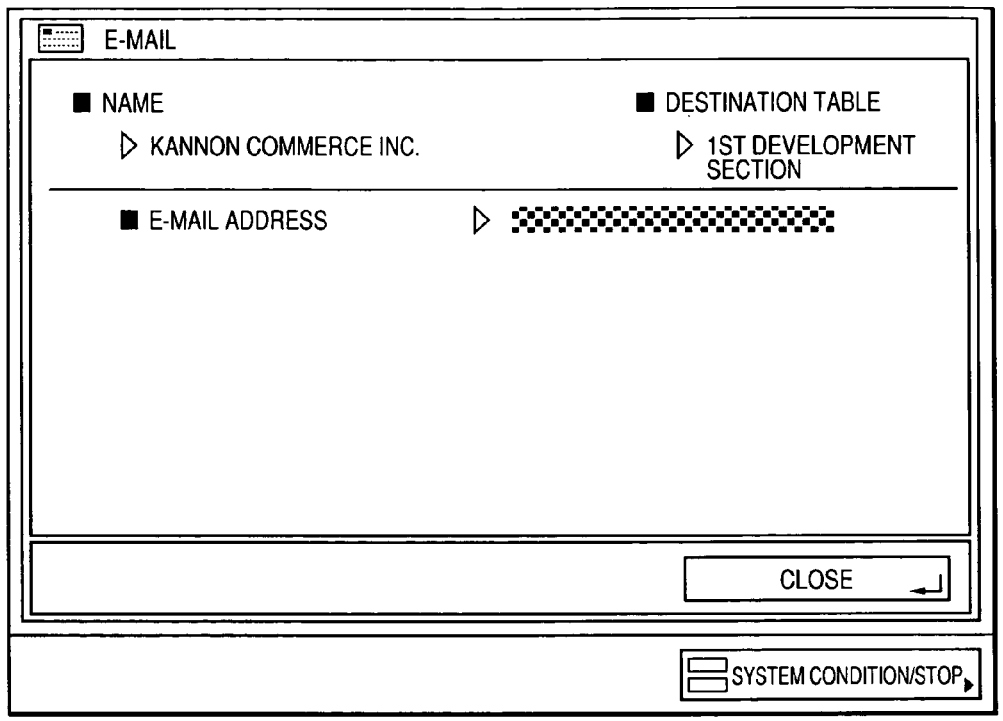
FIGS. 17A and 17B are schematic views showing a detailed information display image after an address designation by the address information display control process in the information transmission apparatus of the present invention shown in FIG. 14.
Figure 17B:
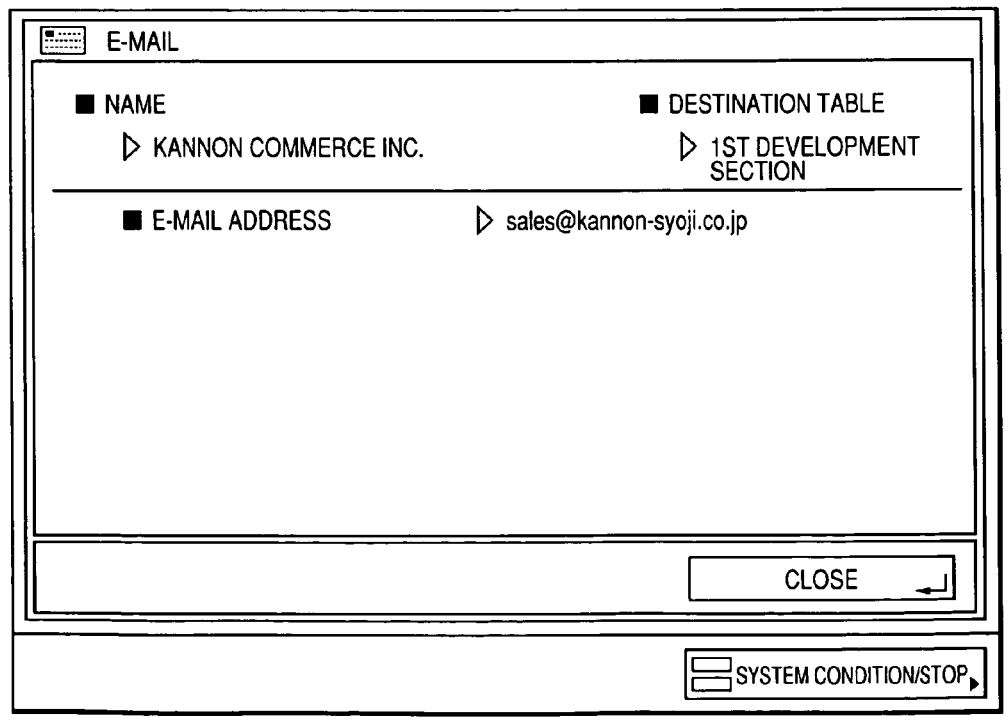

In the transmission/fax image shown in FIGS. 16A and 16B, in response to a touch (instruction) on a detailed information button 1104 (or in response to a detailed information button 106 in the destination table image shown in FIGS. 15A and 15B, the control unit 1709 displays a detail display image as shown in FIGS. 17A and 17B. FIG. 17A shows a case of no input of an access number (or an error in the input access number), while FIG. 17B shows a case of an input of an access number.

Also in the detail display images shown in FIGS. 17A and 17B, in case the access code is not input as shown in FIG. 17A, the control unit 1709 executes a concealing control for example by a mosaic process in such a manner that the e-mail address (address information) itself cannot be read.

Though not illustrated in the flow chart, the control unit 1709 executes a broadcast communication inhibition control of inhibiting selection of an additional address after selecting an unauthorized destination (Kannon Commerce Inc. or Kannon Delivery Inc. in the illustrated example), or inhibiting selection of an unauthorized destination after selecting an address. The control unit 1709 may also be so constructed as to execute a broadcast communication inhibition control in such a manner as to allow selection of plural unauthorized destinations but not to allow a broadcast communication when a start thereof is actually instructed.

This is prevent that the address information is known to an unintended person by the broadcast transmission.

For example, in a broadcast e-mail transmission to plural destinations, addresses are listed in a mail header portion. Such situation is undesirable from the standpoint of security, as the mail header is easily visible to a recipient of the mail.

Therefore, the aforementioned control by the control unit 1709 on the broadcast transmission including the unauthorized destination allows to prevent divulging of the address information by the broadcast transmission.

(Second Embodiment)

The MFP having a transmission function has a report printing function for leaving a record of transmissions at a constant interval (or at a constant time). This function allows the manager to know the use status of the apparatus.

It is also possible for a user, who has left the apparatus before the completion of a transmission, to confirm whether his job has been properly completed, or a user to know whether a fax addressed thereto has arrived.

On the other hand, as a prior communication management report indicates an address of a destination therein, a third person can know the telephone number or the mail address by looking at such report.

As already explained in the first embodiment, address information of a person or an organization should not be divulged freely from the standpoint of security.

However, the deletion of the history itself results in drawbacks that the user cannot judge the outcome of a job executed by the user and that the manager cannot judge the operation status of the apparatus.

Therefore, the MFP of the present embodiment can avoid these drawbacks on the communication management report by concealing the address information, for which an access key is set, from the transmission history.

FIG. 18 is a schematic view showing an example of the communication management report output by an MFP constituting a second embodiment of the invention.

As shown in FIG. 18, the communication management report prints a job start time 1401, a destination address 1402, a destination abbreviated name 1403, a receipt number 1404, a communication mode 1405 etc.

Among these, the destination address 1402 alone is provided in an invisible state, whereby the security is improved while other information are left intact.

Also in case of displaying the communication history in the display unit of the operation unit 1702, the control unit 1709 executes such a control as to conceal the address information for example by a mosaic pattern while leaving other information, in the same manner as in the communication management report shown in FIG. 18.

Though not illustrated, the control unit 1709 executes such a control that the manager of the apparatus can see all the information of including the aforementioned communication management report or communication history by inputting a particular password from the operation unit 1702.

Figure 19:
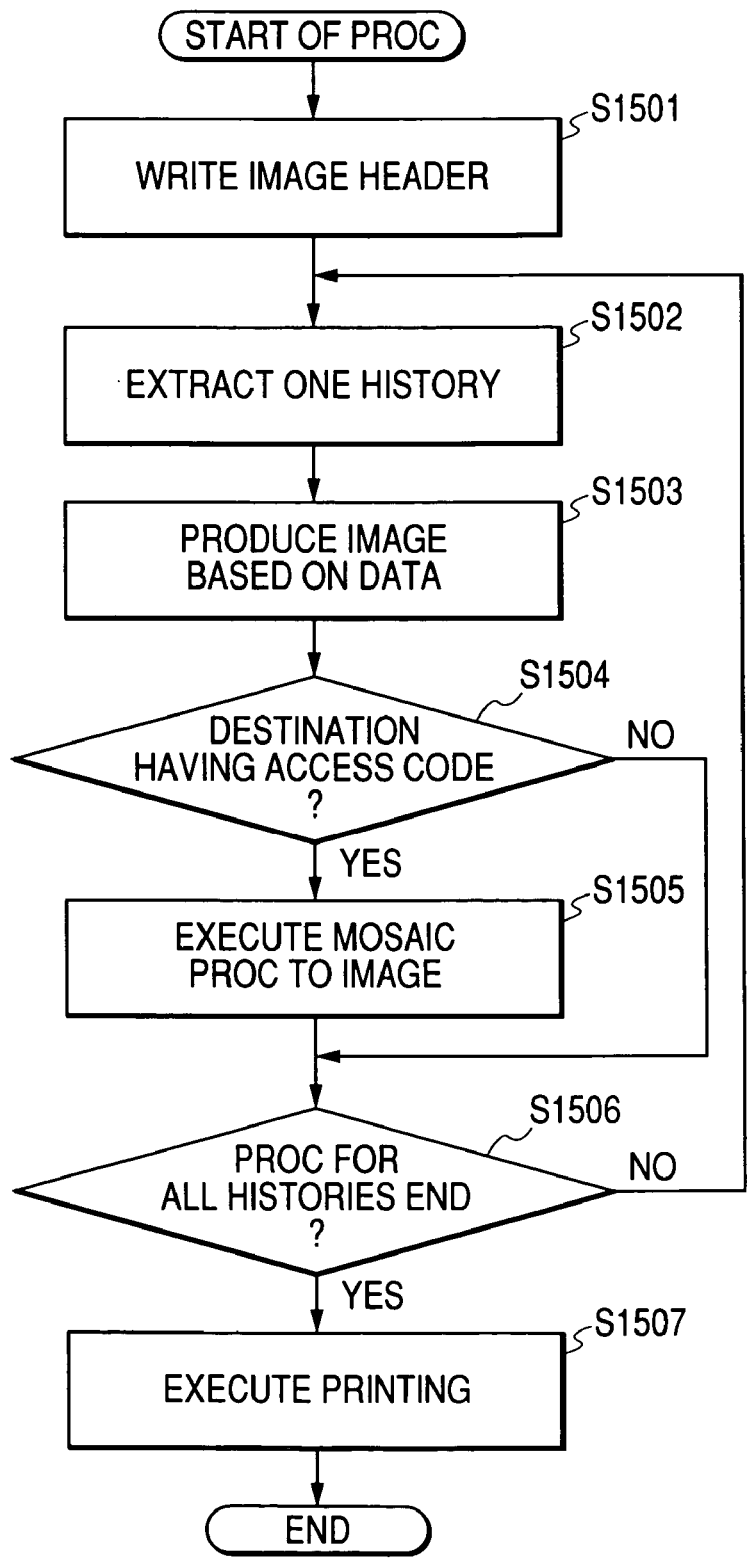
FIG. 19 is a flow chart showing an example of a second control process in the information transmission apparatus of the present invention.

FIG. 19 is a flow chart showing an example of a second control procedure in the information transmission apparatus of the present invention, and corresponds to a communication management report output procedure in the information transmission apparatus of the invention. This flow chart is executed by the CPU of the control unit 1709 shown in FIG. 1, according to a program stored in the ROM or in the hard disk 1708. S1501-S1507 indicate process steps.

At first, when an output of the communication management report by the control unit 1709 is instructed by an unillustrated communication management report output button or at every predetermined time, the control unit 1709 activates the process of this flow chart.

At first the control unit 1709 writes, for printing, the header portion in a memory (RAM of the control unit 1709 shown in FIG. 1) (S1501). The header information includes a kind of apparatus, time and date, a title etc.

Then the control unit 1709 extracts a history from the history information (S1502), and converts the extracted data into an image for printing (S1503).

Then the control unit 1709 discriminates whether a destination contained in the image data formed in the step S1503 has an access code (S1504), and, in case such destination has an access code and thus requires security, executes a mosaic process on the image data formed in the step S1503 (S1505), whereupon the sequence proceeds to a step S1506.

On the other hand, in case the step S1504 identifies that the destination contained in the image data obtained in the step S1503 does not have an access code, the sequence directly proceeds to a step S1506.

The control unit 1709 repeats these steps (S1502-S1505) until all the histories are covered (S1506), and, upon completion on all the histories, prints the finally obtained image data on a sheet medium (S1507) whereupon the sequence is terminated.

Through the aforementioned procedure, there can be obtained an information transmission apparatus that allows to refer to the transmission history but prevents the address information from being known to the third person.

It is thus rendered possible to avoid a situation where the address information is utilized by a third person who receives the information.

(Third Embodiment)

The foregoing first and second embodiments have explained a configuration which regards the user as unauthorized in case of an unmatched access code and conceals the address information (e-mail address, and fax number) only of the address for which the access code is set while displaying the name and the like, but there can also be adopted a configuration having a first display mode for displaying all the information on the address irrespective of an access code input, a second display mode for not displaying all the information on the address in case of no-matching of the access code (or in case the input access code is erroneous), and a third display mode of concealing the address information (e-mail address, and fax number) only of the address for which the access code is set while displaying the name and the like, as in the first embodiment. Such embodiment will be explained in the following.

The control unit 1709 shown in FIG. 1 displays an unillustrated concealed mode setting image on the display unit of the operation unit 1702, thus rendering the first display mode, the second display mode or the third display mode selectable.

Then, in response to a detection of a setting instruction for the display mode from the user, the control unit 1709 stores the instructed display mode (first display mode, second display mode or third display mode) in the hard disk 1708.

In the absence of the display mode setting from the user, the third display mode is selected as a default display mode.

In the following, an address book display process in the information transmission apparatus of the present embodiment will be explained with reference to a flow chart in FIG. 20.

Figure 20:
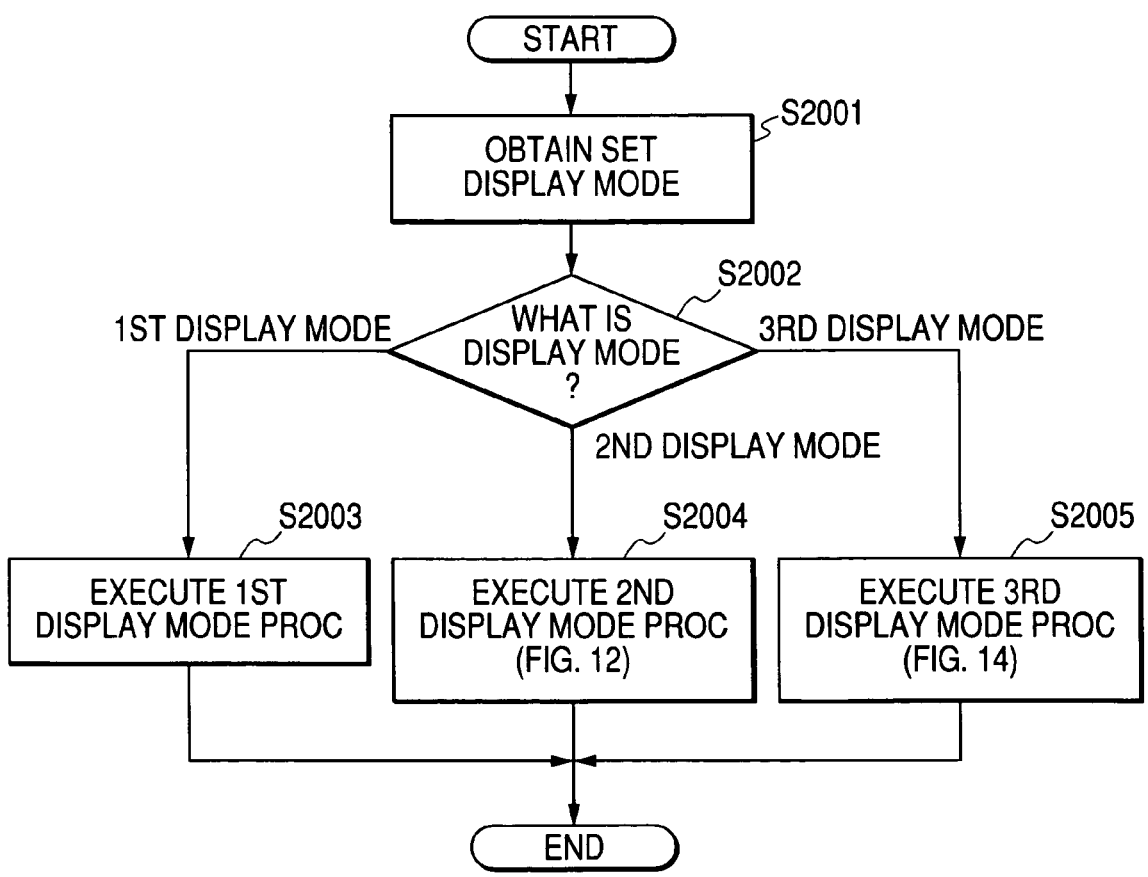
FIG. 20 is a flow chart showing an example of a third control process in the information transmission apparatus of the present invention.

FIG. 20 is a flow chart showing an example of a third control procedure in the information transmission apparatus of the present invention. This flow chart is executed by the CPU of the control unit 1709 shown in FIG. 1, according to a program stored in the ROM or in the hard disk 1708. S2001-S2005 indicate process steps.

At first, when the destination table button 1102 shown in FIG. 3, the OK key 203 in the number input dialog image shown in FIG. 5, the no-access number key 202 in the number input dialog image shown in FIG. 5 or the switching of the sub-address (address book) by the sub-address selection list 103 is selected, the control unit 1709 activates the process of the present flow chart, then obtains the set display mode from the hard disk 1708 in a step S2001, and discriminates, in a step S2002, whether the display mode obtained in the step S2001 is the first display mode, the second display mode or the third display mode.

In case the step S2002 identifies that the first display mode is set, a step S2003 executes the first display mode whereupon the sequence is terminated. The process of the first display mode corresponds to a process in which the control unit 1709 displays all the addresses of the current address book stored in the hard disk on the list (address list 101 shown in FIGS. 4A and 4B).

In case the step S2002 identifies that the second display mode is set, a step S2004 executes the second display mode whereupon the sequence is terminated. The process of the second display mode corresponds to a process shown in the flow chart in FIG. 12.

In case the step S2002 identifies that the third display mode is set, a step S2005 executes the third display mode whereupon the sequence is terminated. The process of the third display mode corresponds to a process shown in the flow chart in FIG. 14.

Through these processes, it is rendered possible to construct a flexible information transmission environment capable of switching a first display mode enabling disclosure and utilization of all address information even to an unauthenticated user, a second display mode disabling utilization of the address for which the access code is set to the unauthenticated user, and a third display mode enabling utilization of the address for which the access code is set to the unauthenticated user without knowing the details of the address such as an e-mail address.

The communication management report output process is so controlled, when the first display mode is selected, as to display all the history data for the destination for which the access code is set, also when the second display mode is selected, as to skip the steps S1503-S1505 in the flow chart in FIG. 19 for the history data of the destination for which the access code is set, and, when the third display mode is selected, as to execute the process of the flow chart in FIG. 19.

In the foregoing embodiments, there has been explained a configuration in which the display/non-display state of the address information (e-mail address or fax number itself) is controlled by matching/non-matching of the access code, but the display/non-display state of the address information may be controlled by authentication information other than the access code.

For example, there can be employed an authentication by an input of a user ID and a password, by an insertion of an IC card, by a fingerprint, a cornea, a face or a palm artery pattern, or by any other method. Also at the registration of each address, an input whether the authentication is necessary or not is requested. In this manner, the address book can be managed for each user, and a setting whether the authentication is necessary or not is possible for each user.

Then the authentication process is executed by any authentication method as mentioned above, and the display/non-display state of the address information for which the authentication is required is controlled according to the result of such authentication.

The authentication process is also executed at the output of the communication management report in response to an instruction of the user, and, in case of a successful authentication, a print in a readable state is permitted without the concealment for example by the mosaic pattern for the address information corresponding to such authentication.

As explained in the foregoing, in the use of an address book for a person (or for a predetermined division or a predetermined group) and in the absence of input of authentication information such as password information, IC card information or fingerprint information, a registered name alone is displayed while address information (specific number or mail address) itself is concealed, whereby an information transmission is enabled based on the registered name only. In this manner the transmission of information is rendered possible even to an unauthenticated user utilizing the address book but not knowing the address details such as the e-mail address.

Also the telephone number and the mail address are concealed from the history in the report at the predetermined time or the error report. In this manner, there can be obtained an information transmission apparatus capable of rendering the transmission history available while concealing the address information to a third person.

Also the broadcast transmission is inhibited in order to prevent that the destination becomes visible from the mail header. This allows to prevent a situation where the address information is utilized by a third person who has received the information.

The aforementioned structures allow to provide an information transmission apparatus provided with an address book for a person (or a predetermined division or a predetermined group), which is usable by another person while concealing the address information such as the fax number or the mail address.

In the foregoing embodiments, there has been explained a case of applying the information transmission apparatus of the invention to an MFP or the like, but it can also be applied to a mail software of a computer or to an address book thereof to enable a mail transmission even to an unauthenticated user from the computer, without knowing the details of the address such as the e-mail address.

A structure formed by combining all the foregoing embodiments or a part thereof is also included in the present invention.

In addition to the foregoing embodiments, the present invention can also be realized in embodiments for example of a system, an apparatus, a method, a program or a storage medium, and may more specifically be applied to a system constituted of plural equipment or an apparatus constituted of a single equipment.

As explained in the foregoing, there can be provided an information transmission apparatus having a personal address book which, in the absence of authentication such as a password input, readably displays a registered name alone thereby allowing another person to utilize such registered name for the information transmission but conceals the specific address information such as the fax number and the e-mail address.

Also the specific address information such as the telephone number and the mail address are concealed from the history in the report at the predetermined time or the error report.

Also the broadcast transmission is inhibited in order to prevent that the destination becomes visible from the mail header to the third person.

These configurations allow to utilize the personal address book by another person while maintaining the secrecy.

In case a user (called first type user) who has registered a destination in the data transmission function executes a data transmission to such registered destination, and upon such user himself being specified in an authentication process, the present embodiment executes such a control as to disclose all the information on the destination (including name information and address information of the destination, and address kind information for specifying an e-mail or a facsimile transmission) to the user through the operation unit 1702. In such a state where all the information of the destination is disclosed, the control unit 1709 controls the apparatus so as to transmit desired data to such destination in a desired data format.

On the other hand, also for a user (second type user) different from the user (first type user) who has registered the destination in the data transmission function, the control unit 1709 controls the apparatus so as to permit such second type user, without an authentication process, to execute a data transmission to such destination, while inhibiting the disclosure of information of secret property such as the address information of the destination, to the second type user.

In this manner, there can be exhibited an effect not only allowing the first type user to comfortably execute a desired data transmission process to a desired destination but also allowing the first type user to safely ask a desired transmission process thereof to a second type user in a state where information not to be known to the second type user is concealed.

However, the present embodiment is not limited to such configuration. For example, let us consider a situation where a first type user who has registered a destination considers that the address information may be known to the second type user but information on a destination name, for identifying the destination of the address, should not be known to the second type user. For example, let us assume a situation where the first type user considers, in the operation image shown in FIGS. 4A and 4B, that the address information of the destination need not be concealed to the second type user but the name information of the destination should be concealed to the second type user.

In order to adapt also to such situation, the control unit 1702 of the embodiment may be so constructed as to execute a control to conceal, to the second type user, in addition to the address information of the destination registered by the first type user, destination name information for identifying the destination of the address. Naturally any other information may also be concealed.

Thus, the apparatus may have any structure, but preferably has a following structure.

At the execution of a data transmission process by the apparatus, the control unit 1709 at first confirms whether a predetermined condition is satisfied.

As an example of the confirmation whether the predetermined condition is satisfied, the embodiment discriminates, as explained above, whether the user operating the operation unit 1702 for executing the data transmission process to the registered destination is a user who has registered such destination (first type user) or another user (second type user). Also there is executed an authentication process by an input of authentication data such as an access number (cf. explanation of the flow chart in FIG. 14).

The control unit 1709, upon identifying that the aforementioned predetermined condition is satisfied, informs the operator of predetermined information on the destination through the operation unit 1702 and controls the apparatus to enable a data transmission process to the destination.

As an example of such control, in case it is identified that an appropriate access code is input through the operation unit 1702 (case of YES in the step S1304 in FIG. 14) or in case that absence of restriction on access is identified (case of YES in the step S1305 in FIG. 14), the control unit 1709 executes a control for displaying, on the display unit of the operation unit 1702, all the information on the registered destination, including the destination address kind information (information for enabling the user to confirm whether the transmission to the destination is by e-mail or facsimile), name information of the address of the destination (for example information specifying a company name or a personal name as shown in FIGS. 15A and 15B) and address information of the destination, thereby executing such display, and enabling a transmission of desired data (for example scanned data by the reader unit 1703 or data stored in the hard disk 1708) to the destination selected by the user through such display.

The control unit 1709, in addition to the aforementioned control, also executes, even in case where the aforementioned predetermined condition is not satisfied, such a control as to enable a data transmission process in a state in which the publication of the information on the destination is inhibited.

As an example of such control, in case it is identified that an appropriate access code is not input through the operation unit 1702 (case of NO in the step S1304 in FIG. 14 and NO in the step S1305), the control unit 1709 executes a control for displaying an operation image in which information to be concealed on the destination is maintained in an invisible state by a mosaic process on the display unit of the operation unit 1702, while information not to be concealed on the destination is maintained in an effective display state, and enabling a transmission of desired data (for example scanned data by the reader unit 1703 or data stored in the hard disk 1708) to the destination selected by the user through such display, in a state where the information to be concealed is maintained in an invisible state to the user.

As explained in the foregoing, the information to be concealed may be, for example, the address information, the name information of the destination or the kind information thereof.

Also in the present embodiment, the information to be concealed in the transmission process may be made selectable by the first type user among plural candidates for the information on the destination.

For example, in the destination registration on the operation image, in case a setting of an access code is identified through the setting image shown in FIG. 11, a setting image for selecting the information, to be concealed by the mosaic process, from plural candidates (for example a kind of destination, a name of destination and an address of destination) is displayed in the display unit of the operation unit 1702. Then the information to be concealed, selected through such image, is registered in a memory in relation to the registration information of the destination. Also, the information selected on such image may be concealably controlled by the control unit 1709 on the image shown in FIG. 15A. The control unit 1709 executes such control for every user executing the registration of the destination. Thus, the information to be concealed can be determined individually for each of plural first type users executing the destination setting.

Such structure further increases the freedom and the effects of the present invention.

In the foregoing, there has been explained a control of displaying predetermined information on the destination, on the display unit of the operation unit 1702, as an example of control for providing the user with the predetermined information on the destination without concealment. Also as an example of control for inhibiting predetermined information on the destination, there has been explained a control of not displaying predetermined information on the destination, on the display unit of the operation unit 1702 (at least maintaining the information in a display state unidentifiable to the user, such as the mosaic display process in the foregoing).

In the foregoing, there has been explained an example of the display control, taking an information display unit as an example of an information unit for providing the user with information. However, the invention is also applicable to an apparatus providing the user with information by another information unit, for example by an audio unit outputting an audio signal.

For example, in case the aforementioned predetermined condition is satisfied, the control unit 1709 executes such a control as to output various information on the destination (for example kind, name and address information of the destination) by an audio signal through an audio unit and thereafter to transmit the desired data to the destination selected by the user through the operation unit 1702. On the other hand, in case the aforementioned predetermined condition is not satisfied, the control unit 1709 executes such a control, in a state where at least the information to be concealed among the various information on the destination is excluded from audio signal by the audio unit, to transmit the desired data to the destination selected by the user through the operation unit 1702.

Controls by the control unit 1709 (for example selective control of inhibition/permission of broadcast transmission) other than those explained above are executed in the same manner as in the foregoing embodiments.

The effects of the present invention can be further enhanced by enabling utilization in such various embodiments.

In the following, there will be explained, with reference to a memory map shown in FIG. 21, the structure of a data processing program readable by the information transmission apparatus of the present invention.

FIG. 21 is a view showing a memory map of a storage medium storing various data processing programs readable by the information transmission apparatus of the present invention.

Also there may be stored information for managing programs stored in the storage medium, such as version information or a manufacturer, and information dependent on the operating system or the like of the program reading side, such as an icon for identifying the program.

Also data belonging to the programs are managed by the directory. There may also be stored a program for installing various programs into a computer and a thawing program in case the program to be installed is compressed.

Functions of the embodiments shown in FIGS. 14, 19, and 20 (including FIG. 12) may be executed by a host computer by an externally installed program. In such case, the present invention can also be realized also in a situation where information including a program is supplied to an output apparatus from a storage medium such as a CD-ROM, a flash memory or an FD or from an external storage medium through a network.

The objects of the present invention can naturally be attained also in case where a storage medium, storing program codes of a software realizing the functions of the aforementioned embodiments, to a system or an apparatus and a computer (or CPU or MPU) of such system or apparatus reads and executes the program codes stored in the storage medium.

In such case, the program codes themselves read from the storage medium realize the novel functions of the present invention, and the storage medium storing the program codes constitutes the present invention.

Therefore, the program is not restricted in its form as long as it can satisfy its function, such as object codes, a program executed by an interpreter, or script data supplied to the OS.

The storage medium for supplying the program can be, for example, a flexible disk, a hard disk, an optical disk, a magnetooptical disk, an MO, a CD-ROM, a CD-R, a CD-RW, a magnetic tape, a non-volatile memory card, a ROM or a DVD.

In such case, the program codes themselves read from the storage medium realize the functions of the aforementioned embodiments, and the storage medium storing the program codes constitutes the present invention.

Also the program can be supplied by connecting to a home page of the internet by a browser of a client computer and by downloading a computer program of the invention or a compressed file including an auto installing function from the home page into a storage medium such as a hard disk. It can also be supplied by dividing the program codes constituting the program of the invention into plural files and downloading such files from respectively different home pages. Thus a www server or an ftp server allowing downloading of a program film, realizing the functions of the invention by a computer, to plural users is also included in the claims of the present invention.

Furthermore, the program can also be supplied by distributing a storage medium such as a CD-ROM, storing the program of the invention in an encrypted form, to the users, then downloading decrypting key information from the home page through the internet to the user who has cleared a predetermined condition, and installing the program, decrypted by such key information, into a computer.

The present invention includes not only a case where the functions of the aforementioned embodiments are realized by the execution of the read program codes by the computer but also a case where an OS (operating system) or the like functioning on the computer executes all the actual processes or a part thereof under the instruction of such program codes, thereby realizing the functions of the aforementioned embodiments.

The present invention further includes a case where the program codes read from the storage medium are once stored in a memory provided in a function expansion board inserted in a computer or a function expansion unit connected thereto and a CPU or the like provided in such function expansion board or function expansion unit executes all the actual processes or a part thereof under the instruction of the program codes thereby realizing the functions of the aforementioned embodiments.

Furthermore, the present invention may be applied to a system constituted of plural equipment or an apparatus constituted of a single equipment. Further, the present invention is naturally applicable to a case where the invention is achieved by supplying a system or an apparatus with a program. In such case, such system or apparatus can enjoy the effects of the present invention by reading a storage medium storing a program represented by a software realizing the present invention.

The present invention is not limited to the foregoing embodiments but is subject to various modifications (including organic combinations of the embodiments) based on the spirit and scope of the invention, and such modifications are not excluded from the scope of the invention.

As explained in the forgoing, in case a display of information on a destination registered by a registration function is requested from an unauthenticated user, the present invention executes a display in a state of concealing the address information thereby enabling to designate the information of the destination, displayed with the address information in the concealed state, as the destination of information transmission, whereby even an unauthenticated user can transmit information by utilizing registration means such as the address book without knowing the address information such as the e-mail address or the facsimile number.

Also by inhibiting the broadcast transmission, by a request from an unauthenticated user, to plural destinations including the destination which is displayed with the address information in the concealed state is inhibited, it is possible to prevent utilization of the address information by a third person who received the information.

Furthermore, by storing the data of the destination of information transmission as history information and outputting such stored history information with the address information in a concealed state, it is possible to render the transmission history available but to prevent the address information from being known to a third person.

Furthermore, according to the invention, information other than the address information may also be assumed as the information to be concealed, and such information to be concealed may be made selectable for each user executing the registration of the destination.

It is thus made possible to prevent various possible drawbacks anticipated in the prior technology, for example a drawback that a fulfillment of one of plural desires of the user inhibits fulfillment of other desires, a drawback that a priority given to one of plural desires of the user leads to another new difficulty, or a drawback that a prevention of all the difficulties results in an inhibition of the desired process itself, thereby allowing to precisely respond to various needs and desires of the user and matching the actual standpoint of the user in consideration of the actual office environment or the actual environment of use of the apparatus by various users, for example allowing a private address book to be utilized by another person while maintaining privacy.

The present invention has been explained by various examples and embodiments, but the scope and spirit of the present invention are not limited to the specific description in the present specification as will be apparent to those skilled in the art.

The present invention, by applying the information transmission apparatus of the invention to a mailing function of a computer and an address book thereof, can be used for example also to a mail transmission from the computer, even for an unauthenticated user, utilizing the address book without knowing the details of the address such as an e-mail address.

This application claims priority from Japanese Patent Application Nos. 2003-375080 filed on Nov. 5, 2003, and 2004-295535 filed on Oct. 8, 2004, which are hereby incorporated by reference herein.

What is claimed is:

1. An information transmission apparatus comprising:
a storage device configured to store identification information identifying each of a plurality of destinations and address information corresponding to each of the plurality of destinations;
a user authentication unit configured to authenticate a user;
a display control unit configured to display the identification information and the address information, if an information display request is received from a user authenticated by said user authentication unit, and to display the identification information without displaying the address information, if the information display request is received from a user not authenticated by said user authentication unit;
a transmission destination designation unit configured to designate a destination, the identification information of which is displayed; and
an information transmission unit configured to execute an information transmission using address information corresponding to the destination designated by said transmission destination designation unit.

2. The information transmission apparatus according to claim 1, further comprising:
a broadcast transmission inhibition unit configured to inhibit a broadcast transmission by the information transmission unit to plural destinations including a destination corresponding to the identification information displayed in a state in which the address information is not displayed by said display control unit, in response to the information display request from the user not authenticated by said user authentication unit.

3. The information transmission apparatus according to claim 1, further comprising:
a transmission history storage unit configured to store the identification information and the address information corresponding to the destination to which the information is transmitted by said information transmission unit as history information; and
a transmission history address information concealment unit configured to output the history information, stored in said transmission history storage unit, in the state in which the address information is not displayed.

4. The information transmission apparatus according to claim 1, wherein the address information corresponding to the destination is an e-mail address or a facsimile number, and said information transmission unit executes the information transmission by an e-mail, an internet facsimile, or a facsimile using the address information corresponding to the destination designated by said transmission destination designation unit.

5. A control method performed by an information transmission apparatus that includes a central processing unit, the control method comprising steps of:
registering identification information identifying each of a plurality of Destinations and address information corresponding each of the plurality of destinations;
displaying the identification information and the address information, if an information display request is received from an authenticated user;
displaying the identification information without displaying the address information, if the information display request is received from an unauthenticated user;
designating a destination, the identification information of which is displayed; and
executing an information transmission using address information to the designated destination,
wherein at least one of the above steps is performed, at least in part, by the central processing unit.

6. A non-transitory computer-readable storage medium storing a program for executing an information destination designating method in an information transmission apparatus, the program comprising:
a code to register identification information of each of a plurality of destinations and address information,
a code to authenticate a user;
a code to display the identification information and the address information, if an information display request is received from an authenticated user;
a code to display the identification information without displaying the address information, if the information display request is received from an unauthenticated user;
a code to designate a destination, the identification information of which is displayed; and
a code to execute an information transmission using address information corresponding to the designated destination.

7. An information transmission apparatus comprising:
a storage device configured to store identification information identifying each of a plurality of destinations and address information corresponding to each of the plurality of destinations;
a user authentication unit configured to authenticate a user based on predetermined authentication information;
a display control unit configured to display identification information and address information, if an information display request is received from a user authenticated based on first authentication information by said user authentication unit, and to display the identification information without displaying the address information, if the information display request is received from a user authenticated based on second authentication information by said user authentication unit;
a transmission destination designation unit configured to designate a destination, the identification information of which is displayed; and
an information transmission unit configured to execute an information transmission using address information corresponding to the destination designated by said transmission destination designation unit.

8. The information transmission apparatus according to claim 7, further comprising:
a broadcast transmission inhibition unit configured to inhibit a broadcast transmission by the information transmission unit to plural destinations including a destination corresponding to the identification information displayed without displaying the address information, in response to the request from the user authenticated based on the second authentication information by said user authentication unit.

9. The information transmission apparatus according to claim 7, wherein the address information corresponding to the destination is an e-mail address or a facsimile number, and said information transmission unit executes the information transmission by an e-mail, an internet facsimile, or a facsimile using the address information corresponding to the destination designated by said transmission destination designation unit.

* * * * *